(12) United States Patent
Simmons

(10) Patent No.: US 10,299,439 B2
(45) Date of Patent: May 28, 2019

(54) INDEXING WRAPPING SYSTEM AND SUPPORTING SYSTEMS

(71) Applicant: CNH Industrial America LLC, New Holland, PA (US)

(72) Inventor: Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 1076 days.

(21) Appl. No.: 14/689,394

(22) Filed: Apr. 17, 2015

(65) Prior Publication Data

US 2016/0007539 A1    Jan. 14, 2016

Related U.S. Application Data

(60) Provisional application No. 61/981,698, filed on Apr. 18, 2014, provisional application No. 61/981,706, filed on Apr. 18, 2014.

(51) Int. Cl.
```
A01F 15/07    (2006.01)
B65B 41/16    (2006.01)
B65H 16/02    (2006.01)
B65B 41/12    (2006.01)
```
(52) U.S. Cl.
CPC ........ *A01F 15/0715* (2013.01); *A01F 15/071* (2013.01); *A01F 2015/072* (2013.01); *A01F 2015/0725* (2013.01); *B65B 41/12* (2013.01); *B65B 41/16* (2013.01); *B65H 16/021* (2013.01); *B65H 16/023* (2013.01); *B65H 2301/41* (2013.01); *B65H 2301/412* (2013.01); *B65H 2301/415* (2013.01); *B65H 2301/4128* (2013.01); *B65H 2301/41501* (2013.01)

(58) Field of Classification Search
CPC ................ A01F 15/071; A01F 15/0715; A01F 2015/072; A01F 2015/0725; B65B 11/04; B65B 41/12; B65B 41/16; B65H 16/021; B65H 16/023; B65H 2408/24156; B65H 2408/241; B65H 2408/2412; B65H 2301/41; B65H 2301/412; B65H 2301/4128; B65H 2301/415; B65H 2301/41501
USPC .......... 53/118, 168, 587, 389.1, 389.2, 389.4
See application file for complete search history.

(56) References Cited

U.S. PATENT DOCUMENTS

| | | | | |
|---|---|---|---|---|
| 2,195,141 A | * | 3/1940 | Wise Wood | ......... B65H 16/021 |
| | | | | 242/559.2 |
| 3,204,887 A | | 9/1965 | Hansen et al. | |
| 3,695,532 A | * | 10/1972 | Lindstaedt | ........... B65H 16/021 |
| | | | | 242/559.4 |

(Continued)

FOREIGN PATENT DOCUMENTS

EP    1602269 A1    12/2005

*Primary Examiner* — Alexander M Valvis
*Assistant Examiner* — Eduardo R Ferrero
(74) *Attorney, Agent, or Firm* — Patrick M. Sheldrake; Peter K. Zacharias

(57) ABSTRACT

A wrapping mechanism is described that comprises at least two material support cylinders, a mechanism support cylinder, and a first and a second support plate, which are all rotatable about a support axis. The wrapping mechanism can comprise a pair of frame plates, a drive mechanism, a brake system, a lock mechanism, at least one feed roller and a feed plate. The wrapping mechanism can be integrated into an agricultural harvester such as a baler or combine.

20 Claims, 13 Drawing Sheets

(56) References Cited

U.S. PATENT DOCUMENTS

| | | | | |
|---|---|---|---|---|
| 4,040,043 | A | * | 8/1977 | Stanford .............. B65H 23/063 226/37 |
| 4,492,138 | A | * | 1/1985 | Breuers ................ B65H 16/021 83/203 |
| 4,597,241 | A | * | 7/1986 | Clostermeyer ..... A01F 15/0715 242/595 |
| 4,903,909 | A | | 2/1990 | Suzuki |
| 4,934,575 | A | * | 6/1990 | Mustafa ............. A47K 10/3687 225/38 |
| 5,046,296 | A | * | 9/1991 | Drury .................. A01F 15/071 242/597.7 |
| 5,181,368 | A | * | 1/1993 | Anstey ................ A01F 15/0715 242/422.5 |
| 5,207,394 | A | * | 5/1993 | La Fleur, Jr. ........ B65H 16/021 242/560.1 |
| 5,241,906 | A | * | 9/1993 | Kansaku .............. B65H 16/021 101/228 |
| 5,746,043 | A | * | 5/1998 | Terminella .......... B29C 66/8225 53/451 |
| 5,855,109 | A | * | 1/1999 | Vande Ryse ......... A01D 89/004 100/88 |
| 5,974,764 | A | | 11/1999 | Anstey et al. |
| 5,979,141 | A | | 11/1999 | Phillips |
| 6,247,291 | B1 | | 6/2001 | Underhill |
| 6,295,797 | B1 | | 10/2001 | Naaktgeboren et al. |
| 6,644,006 | B1 | | 11/2003 | Merritt et al. |
| 6,651,408 | B1 | | 11/2003 | McClure |
| 6,688,092 | B2 | | 2/2004 | Anstey et al. |
| 6,823,646 | B2 | | 11/2004 | McClure et al. |
| 6,877,304 | B1 | | 4/2005 | Smith et al. |
| 7,334,382 | B2 | | 2/2008 | Smith |
| 7,356,981 | B2 | | 4/2008 | McClure et al. |
| 7,644,559 | B2 | | 1/2010 | Smith |
| 7,716,903 | B2 | | 5/2010 | McClure et al. |
| 8,490,366 | B1 | | 7/2013 | Hintz |
| 8,516,779 | B2 | | 8/2013 | Bennett et al. |
| 8,925,287 | B2 | | 1/2015 | Derscheid |
| 9,480,204 | B2 | * | 11/2016 | Bonte .................... B60T 7/102 |
| 9,511,665 | B2 | * | 12/2016 | Huber .................... B60K 17/28 |
| 2002/0130214 | A1 | * | 9/2002 | Nakamura ............. B65H 16/06 242/559.2 |
| 2002/0139893 | A1 | * | 10/2002 | Hashimoto ........... B65H 16/103 242/564 |
| 2004/0200922 | A1 | * | 10/2004 | Nakamura ............. B65H 16/06 242/596.5 |
| 2012/0073249 | A1 | * | 3/2012 | Pryor .................... B26D 7/325 53/514 |
| 2012/0240516 | A1 | | 9/2012 | Chapon et al. |
| 2013/0125518 | A1 | | 5/2013 | Smith et al. |
| 2013/0305683 | A1 | | 11/2013 | Ziembicki |

* cited by examiner

INDEXING WRAPPING SYSTEM AND SUPPORTING SYSTEMS

This application claims the benefit of and priority to U.S. Provisional Application No. 61/981,698, filed Apr. 18, 2014, entitled INDEXING WRAPPING SYSTEM AND SUPPORTING SYSTEMS and U.S. Provisional Application No. 61/981,706, filed Apr. 18, 2014, entitled INDEXING NET WRAP SYSTEM, each of which is hereby incorporated by reference in its entirety.

TECHNOLOGY FIELD

The present disclosure relates generally to a device and physical support article for the installation and storage of wrapping material in a harvester, particularly to multiple material support cylinders in a wrapping mechanism which hold rolls of wrapping material and revolves about a support axis in a plurality of positions, and to related supporting systems, including brake, lever plate, and drum lock system.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material in to the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Wrapping material is fed into the baler off a wrapping material roll and into a wrapping mechanism, conventionally located in the front of the baler. As the baler forms, bounds, and distributes the bale, wrapping material is depleted until the roll needs to be replaced by a spare. Typically, one or two spare wrapping material rolls are stored on the baler, usually housed at the rear of the baler at the tailgate. When a roll of wrapping material needs to be replaced, the operator discards the depeted roll, walks to the back of the baler to acquire a stored roll, then walks the stored roll to the front of the baler, and installs the new roll. Wrapping material roll length typically measures 122 to 130 centimeters (48 to 51 inches) in length and between 30 and 45 kilograms (70 to 100 pounds) in weight. The size, weight, and typical location for spare roll storage create a burden for an operator to transport the roll from the rear of the baler and install the roll at the front of the baler. The operator is tasked to lift the roll to a material support cylinder and slide the roll onto the cylinder. The material support cylinder can be 4 to 5 feet off the ground. Additionally, once on the cylinder, the wrapping material roll is then pushed into the operating position. Thus, it is desireable to minimize operator effort to replace a roll of wrapping material. Relatedly, it is also desireable to improve storage capability of rolls of wrapping material on balers.

The invention relates to a storage location and a process for wrapping material roll indexing that minimizes manual operator effort for placement and access to wrapping material rolls in an active postions, and minimizes the time of total manual operator involvement when replacing and installing a roll of wrapping material. The purpose of the invention is to improve the efficiency of the baler operation by reducing the time it takes for a baler operator to replace a roll of warpping material.

SUMMARY OF THE INVENTION

The invention relates to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve; and at least one drive mechanism operably connected to at least the first support plate such that the movement of the drive mechanism drives the revolution of the at least two material support cylinders from a first position to one or more radial positions around the support axis; wherein the at least two material support cylinders are operably attached to at least the first support plate; wherein the at least two material support cylinders are configured for the support of wrapping material; and wherein at least one position of at least one material support cylinder is configured for the dispensing of wrapping material.

In some embodiments, the at least two material support cylinders comprising a first end operably connected to the first support plate by a pivoting element; and a second end operably contacted with the second support plate in at least one notch and with a lever plate positioned around the opening of the at least one notch such that the lever plate prevents pivoting motion of the material support cylinder in its first operable condition; wherein the pivoting element is configured to pivot the second end of a respective material support cylinder away from the second support plate when the lever plate moves away from the opening of the at least one notch.

In some embodiments, the wrapping mechanism also comprises: a pair of oppositely facing frame plates, a brake system, a lock mechanism, at least one feed roller, and a feed plate; wherein the at least two material support cylinders, the at least one feed roller, and the first and the second support plates are positioned between the pair of frame plates; and wherein the mechanism support cylinder passes through the first and the second support plates and is operably attached to the pair of oppositely facing frame plates on the support axis around which the at least two material support cylinders revolve.

In some embodiments, the brake system is configured to apply and release tension to wrapping material supported on the at least one material support cylinder, which comprises: a brake arm, a brake handle, a spring, a counter wheel, and a brake pad; wherein the brake system operates in at least a first and a second operable position; wherein the first operable position of the brake system prevents wrapping material supported on the at least one material support cylinder from rotating about the support axis; wherein the second operable position of the brake system allows wrapping material supported on the at least one material support cylinder to rotate about the support axis; wherein the brake handle has at least a first and a second operable position; wherein the first operable position of the brake handle causes the brake system to be operably connected with the material support cylinders, such that the material support cylinders are prevented from rotating about the support axis; and wherein the second operable position of the brake handle causes the brake system to be positioned such that the material support cylinders are allowed to rotate around the support axis.

In some embodiments, the wrapping mechanism comprises a lock mechanism comprising: a lock gear operably connected to the mechanism support cylinder, and rotatable with the first and second support plate about the support axis; and a lock pin that is movable between at least a first and a second operable position; wherein the first operable position of the lock pin prevents the lock gear, the mechanism support cylinder, and the first and second support plates from rotating around the support axis; and wherein the second operable position of the lock pin allows the lock gear, the mechanism support cylinder, and the first and second support plates to rotate around the support axis.

In some embodiments, the at least two material support cylinders which are adapted to mount a roll of wrapping material around their axes; wherein at least one of their plurality of radial positions, the roll of wrapping material is capable of rotation thereby allowing wrapping material to dispense from the roll of wrapping material through the feed roller and the feed plate; wherein the brake system in a first operable position prevents the rotation of the material support cylinders around the support axis; wherein the lock mechanism in a first operable position prevents the rotation of the mechanism support cylinder and the first and second support plates around the support axis; and wherein the brake system in a second operable position and the lock mechanism in a second operable position allows for the rotation of the material support cylinders, the mechanism support cylinder, and the first and second support plates around the support axis.

Aspects of the invention relate to a harvester comprising: at least one bale chamber; a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve; at least one drive mechanism operably connected to at least the first support plate such that the movement of the drive mechanism drives the revolution of the at least two material support cylinders from a first position to one or more radial positions around the support axis; and, optionally, an access cover that permits accessibility of the wrapping mechanism from a point external to the harvester; wherein the at least two material support cylinders are operably attached to at least the first support plate; wherein the at least two material support cylinders are configured for the support of wrapping material; and wherein at least one position of at least one material support cylinder is configured for the dispensing of wrapping material into a bale chamber of the harvester.

In some embodiments, the at least two material support cylinders comprising a first end operably connected to the first support plate by a pivoting element; and a second end operably contacted with the second support plate in at least one notch and with a lever plate positioned around the opening of the at least one notch such that the lever plate prevents pivoting motion of the material support cylinder in its first operable condition; wherein the pivoting element is configured to pivot the second end of a respective material support cylinder away from the second support plate when the lever plate moves away from the opening of the at least one notch.

In some embodiments, the harvester comprises a pair of oppositely facing frame plates, a brake system, a lock mechanism, at least one feed roller, and a feed plate; wherein the at least two material support cylinders, the at least one feed roller, and the first and the second support plates are positioned between the pair of frame plates; and wherein the mechanism support cylinder passes through the first and the second support plates and is operably attached to the pair of oppositely facing frame plates on the support axis around which the at least two material support cylinders revolve.

In some embodiments, the brake system is configured to apply and release tension to wrapping material supported on the at least one material support cylinder, which comprises: a brake arm, a brake handle, a spring, a counter wheel, and a brake pad; wherein the brake system operates in at least a first and a second operable position; wherein the first operable position of the brake system prevents wrapping material supported on the at least one material support cylinder from rotating about the support axis; wherein the second operable position of the brake system allows wrapping material supported on the at least one material support cylinder to rotate about the support axis; wherein the brake handle has at least a first and a second operable position; wherein the first operable position of the brake handle causes the brake system to be operably connected with the material support cylinders, such that the material support cylinders are prevented from rotating about the support axis; and wherein the second operable position of the brake handle causes the brake system to be positioned such that the material support cylinders are allowed to rotate around the support axis.

In some embodiments, the lock mechanism comprises: a lock gear operably connected to the mechanism support cylinder, and rotatable with the first and second support plate about the support axis; and a lock pin that is movable between at least a first and a second operable position; wherein the first operable position of the lock pin prevents the lock gear, the mechanism support cylinder, and the first and second support plates from rotating around the support axis; and wherein the second operable position of the lock pin allows the lock gear, the mechanism support cylinder, and the first and second support plates to rotate around the support axis.

In some embodiments, the invention also relates to a harvester comprising at least two material support cylinders which are adapted to mount a roll of wrapping material around their axes; wherein at least one of their plurality of radial positions, the roll of wrapping material is capable of rotation thereby allowing wrapping material to dispense from the roll of wrapping material through the feed roller and the feed plate; wherein the brake system in a first operable position prevents the rotation of the material support cylinders around the support axis; wherein the lock mechanism in a first operable position prevents the rotation of the mechanism support cylinder and the first and second support plates around the support axis; and wherein the brake system in a second operable position and the lock mechanism in a second operable position allows for the rotation of the material support cylinders, the mechanism support cylinder, and the first and second support plates around the support axis.

Aspects of the invention relate to a method for installing rolls of wrapping material into a harvester comprising: (a) moving the brake system to its second operable position; (b) moving the lever plate from its first operable position over the opening of the at least one notch with the wrapping material to a second operable position exposing the opening of the at least one notch; (c) pivoting at least one material support cylinder away from its axis; (d) mounting a roll of wrapping material over the at least one material support cylinder; (e) pivoting the roll of wrapping material and at least one material support cylinder back to its axis; (f) moving the lever plate its first operable position; (g) moving the lock pin to its second operable position; (h) activating the at least one drive mechanism to revolve the at least two support plates from a first position to the next radial position; (i) repeating steps (b) through (f); (j) repeating steps (h) and (i) as desired; (k) moving the lock pin to its first operable position; (l) moving the brake system to its first operable position.

Aspects of the invention relate to a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the spring comprises a plurality of active and at least one non-active positions; wherein in at least a first active position, the spring maintains a tension between the first and second non-coaxial elements such that movement or motion in the first non-coaxial element is transferred to the second non-coaxial element; and in at least a first non-active position, the spring releases the tension between the first and second non-coaxial elements.

In some embodiments, the brake system further comprises the hooked element operably linked to one end of the at least one coaxial member and comprising at least one curved member and at least one straight member; wherein the at least one curved member of the hooked element is attached to a feed plate capable of movement between an active and a passive position; wherein the active position of the feed plate applies tension on the hooked element such that the at least one coaxial element rotates around the linear axis; and wherein the passive position of the feed plate does not apply tension or applies a limited amount of tension such that the at least one coaxial element does not rotate around the linear axis. In some embodiments, the brake system further comprises the hooked element operably linked to one end of the at least one coaxial member and comprising at least one curved member and at least one straight member; wherein the at least one curved member of the hooked element is attached to a feed plate capable of movement between an active and a passive position; wherein the active position of the feed plate applies tension on the hooked element such that the at least one coaxial element operably connected to the brake pad rotates around the linear axis such that the brake pad is not in operable contact with a drum wheel of a material support cylinder. In some embodiments, the brake system further comprises the hooked element operably linked to one end of the at least one coaxial member and comprising at least one curved member and at least one straight member; wherein the at least one curved member of the hooked element is attached to a feed plate capable of movement between an active and a passive position; wherein the active position of the feed plate applies tension and causes movement of the hooked element such that the non-coaxial member to which the brake pad is connected moves the brake pad from a drum wheel to allow free rotation of the material support cylinder and feeding of the net wrapping material into the feed plate.

In some embodiments, the at least one coaxial element is operably connected to the second non-coaxial element, the third non-coaxial elements, and, optionally, the at least one straight member of the hooked element; and wherein the at least one coaxial element, the second non-coaxial element, the third non-coaxial element, and, optionally, the at least one straight member are capable of synchronized rotation about the linear axis; wherein the second non-coaxial element, the third non-coaxial element, and the straight member optionally maintain a fixed position in relation to each other around the linear axis.

In some embodiments, the lever is in the at least one engaged position, the at least one counterwheel is capable of exacting contact and pressure to a roll of wrapping material positioned proximate to the counterwheel, and the at least one brake pad is capable of exacting contact and pressure to a drum wheel positioned proximate to the brake pad, wherein, when the lever is in the at least one engage position, the at least one counterwheel exacts pressure and tension to a roll of wrapping material positioned proximate to the counterwheel, and the at least one brake pad exacts contact and pressure to a drum wheel positioned proximate to the brake pad; and wherein, when the lever is in the at least one engaged position and the feed plate is in an active position, the at least one brake pad does not exact contact and pressure to a drum wheel proximate to the brake pad.

In some embodiments, when the lever is in the at least one or a plurality of disengaged positions, the at least one counterwheel does not exact contact and pressure to a roll of wrapping material positioned proximate to the counterwheel, and the at least one brake pad does not exact contact and pressure to a drum wheel positioned proximate to the brake pad; wherein, when the lever moves from the at least one engaged position to the one or a plurality of disengaged positions, the at least one counterwheel moves radially around the linear axis; and wherein, when the lever moves from the at least one engaged position to the one or a plurality of disengaged positions or when the feed plate is in the active position, the at least one brake pad pivots around the linear axis.

In some embodiments, the brake system further comprises a fourth non-coaxial element extending transversely from the linear axis, comprising at least one end that is operably attached to the at least one elongated member; wherein the fourth non-coaxial element is capable of radial movement around the linear axis when the lever is moved from the at least one engaged position to the one or a plurality of disengaged positions.

In some embodiments, the brake system is configured for reducing the speed or stopping movement of a at least one drum wheel positioned proximate to the brake system and oppositely facing at least one support plate between which a material support cylinder is positioned for mounting a roll of wrapping material, wherein the brake system is configured for reducing the speed or stopping movement of the roll of wrapping material in a plurality of engaged and disengaged conditions comprising: a first engaged position whereby the lever is in the at least one engaged position, the spring is in an active position, the counterwheel is in operable contact with the roll of wrapping material, the feed plate is in the passive position, and the brake pad is in operable contact with the at least one drum wheel; a first disengaged position whereby the lever is in the at least one engaged position, the spring is in an active position, the counterwheel is in operable contact with the roll of wrapping material, the feed plate is in an active position, and the brake pad is not in operable contact with the at least one drum wheel; and a second disengaged position whereby the lever is in the at least one disengaged position, the spring is in a at least one passive position, the counterwheel is not in operable contact with the roll of wrapping material, and the brake pad is not in operable contact with the at least one drum wheel.

In some embodiments, the roll of wrapping material exacts contact and pressure to the counterwheel when the lever is in the at least one engaged position, such that, as the roll of wrapping material is being dispensed, an amount of pressure being exerted to the counterwheel is decreased, causing the brake pad to exert less pressure on the drum wheel of the material support cylinder, and allowing faster rotation of the roll of wrapping material and a steady amount of dispensing of the wrapping material.

Aspects of the invention relate to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis; a pair of oppositely facing frame plates; a lock mechanism; at least one feed roller; and a feed plate; wherein the at least two material support cylinders are operably attached to at least the first support plate; wherein the at least two material support cylinders are configured for supporting rolls of wrapping material, and optionally loading or unloading a roll of wrapping material at the first radial position around the support axis; and wherein at least one radial position of at least one material support cylinder is configured for dispensing wrapping material; and a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the spring comprises a plurality of active and at least one non-active positions; wherein in at least a first active position, the spring maintains a tension between the first and second non-coaxial elements such that movement or motion in the first non-coaxial element is transferred to the second non-coaxial element; and in at least a first non-active position, the spring releases the tension between the first and second non-coaxial elements.

In some embodiments, the wrapping mechanism further comprises the hooked element operably linked to one end of the at least one coaxial member and comprising at least one curved member and at least one straight member; wherein the at least one curved member of the hooked element is attached to a feed plate capable of movement between an active and a passive position; wherein the active position of the feed plate applies tension on the hooked element such that the at least one coaxial element rotates around the linear axis; and wherein the passive position of the feed plate does not apply tension or applies a limited amount of tension such that the at least one coaxial element does not rotate around the linear axis.

In some embodiments, the at least one coaxial element is operably connected to the second non-coaxial element, the third non-coaxial elements, and, optionally, the at least one straight member of the hooked element; and wherein the at least one coaxial element, the second non-coaxial element, the third non-coaxial element, and, optionally, the at least one straight member are capable of synchronized rotation about the linear axis; wherein the second non-coaxial element, the third non-coaxial element, and the straight member optionally maintain a fixed position in relation to each other around the linear axis.

In some embodiments, the lever is in the at least one engaged position, the at least one counterwheel is capable of exacting contact and pressure to a roll of wrapping material positioned proximate to the counterwheel, and the at least one brake pad is capable of exacting contact and pressure to a drum wheel positioned proximate to the brake pad, wherein, when the lever is in the at least one engage position, the at least one counterwheel exacts pressure and tension to a roll of wrapping material positioned proximate to the counterwheel, and the at least one brake pad exacts contact and pressure to a drum wheel positioned proximate to the brake pad; and wherein, when the lever is in the at least one engaged position and the feed plate is in an active position, the at least one brake pad does not exact contact and pressure to a drum wheel proximate to the brake pad.

In some embodiments, when the lever is in the at least one or a plurality of disengaged positions, the at least one counterwheel does not exact contact and pressure to a roll of wrapping material positioned proximate to the counterwheel, and the at least one brake pad does not exact contact and pressure to a drum wheel positioned proximate to the brake pad; wherein, when the lever moves from the at least one engaged position to the one or a plurality of disengaged positions, the at least one counterwheel moves radially around the linear axis; and wherein, when the lever moves from the at least one engaged position to the one or a plurality of disengaged positions or when the feed plate is in the active position, the at least one brake pad pivots around the linear axis.

In some embodiments, the wrapping mechanism further comprises a fourth non-coaxial element extending transversely from the linear axis, comprising at least one end that is operably attached to the at least one elongated member; wherein the fourth non-coaxial element is capable of radial movement around the linear axis when the lever is moved from the at least one engaged position to the one or a plurality of disengaged positions.

In some embodiments, the brake system is configured for reducing the speed or stopping movement of a at least one drum wheel positioned proximate to the brake system and oppositely facing at least one support plate between which a material support cylinder is positioned for mounting a roll of wrapping material, wherein the brake system is configured for reducing the speed or stopping movement of the roll of wrapping material in a plurality of engaged and disengaged conditions comprising: a first engaged position whereby the lever is in the at least one engaged position, the spring is in an active position, the counterwheel is in operable contact with the roll of wrapping material, the feed plate is in the passive position, and the brake pad is in operable contact with the at least one drum wheel; a first disengaged position whereby the lever is in the at least one engaged position, the spring is in an active position, the counterwheel is in operable contact with the roll of wrapping material, the feed plate is in an active position, and the brake pad is not in operable contact with the at least one drum wheel; and a second disengaged position whereby the lever is in the at least one disengaged position, the spring is in a at least one passive position, the counterwheel is not in operable contact with the roll of wrapping material, and the brake pad is not in operable contact with the at least one drum wheel.

In some embodiments, the roll of wrapping material exacts contact and pressure to the counterwheel when the lever is in the at least one engaged position, such that, as the roll of wrapping material is being dispensed, an amount of pressure being exerted to the counterwheel is decreased, causing the brake pad to exert less pressure on the drum wheel of the material support cylinder, and allowing faster rotation of the roll of wrapping material and a steady amount of dispensing of the wrapping material.

In some embodiments, the wrapping mechanism further comprises a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the wrapping mechanism further comprises a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the wrapping mechanism further comprises: a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm; and a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

Aspects of the inventor relate to a harvester comprising: at least one bale chamber; a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis; a pair of oppositely facing frame plates; a lock mechanism; at least one feed roller; and a feed plate; wherein the at least two material support cylinders are operably attached to at least the first support plate; wherein the at least two material support cylinders are configured for supporting rolls of wrapping material, and optionally loading or unloading a roll of wrapping material at the first radial position around the support axis; and wherein at least one radial position of at least one material support cylinder is configured for dispensing wrapping material; and a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the spring comprises a plurality of active and at least one non-active positions; wherein in at least a first active position, the spring maintains a tension between the first and second non-coaxial elements such that movement or motion in the first non-coaxial element is transferred to the second non-coaxial element; and in at least a first non-active position, the spring releases the tension between the first and second non-coaxial elements.

In some embodiments, the harvester further comprises the hooked element operably linked to one end of the at least one coaxial member and comprising at least one curved member and at least one straight member; wherein the at least one curved member of the hooked element is attached to a feed plate capable of movement between an active and a passive position; wherein the active position of the feed plate applies tension on the hooked element such that the at least one coaxial element rotates around the linear axis; and wherein the passive position of the feed plate does not apply tension or applies a limited amount of tension such that the at least one coaxial element does not rotate around the linear axis.

In some embodiments, the at least one coaxial element is operably connected to the second non-coaxial element, the third non-coaxial elements, and, optionally, the at least one straight member of the hooked element; and wherein the at least one coaxial element, the second non-coaxial element, the third non-coaxial element, and, optionally, the at least one straight member are capable of synchronized rotation about the linear axis; wherein the second non-coaxial element, the third non-coaxial element, and the straight member optionally maintain a fixed position in relation to each other around the linear axis.

In some embodiments, the lever is in the at least one engaged position, the at least one counterwheel is capable of exacting contact and pressure to a roll of wrapping material positioned proximate to the counterwheel, and the at least one brake pad is capable of exacting contact and pressure to a drum wheel positioned proximate to the brake pad, wherein, when the lever is in the at least one engage position, the at least one counterwheel exacts pressure and tension to a roll of wrapping material positioned proximate to the counterwheel, and the at least one brake pad exacts contact and pressure to a drum wheel positioned proximate to the brake pad; and wherein, when the lever is in the at least one engaged position and the feed plate is in an active position, the at least one brake pad does not exact contact and pressure to a drum wheel proximate to the brake pad.

In some embodiments, when the lever is in the at least one or a plurality of disengaged positions, the at least one counterwheel does not exact contact and pressure to a roll of wrapping material positioned proximate to the counterwheel, and the at least one brake pad does not exact contact and pressure to a drum wheel positioned proximate to the brake pad; wherein, when the lever moves from the at least one engaged position to the one or a plurality of disengaged positions, the at least one counterwheel moves radially around the linear axis; and wherein, when the lever moves from the at least one engaged position to the one or a plurality of disengaged positions or when the feed plate is in the active position, the at least one brake pad pivots around the linear axis.

In some embodiments, the harvester further comprises a fourth non-coaxial element extending transversely from the linear axis, comprising at least one end that is operably attached to the at least one elongated member; wherein the fourth non-coaxial element is capable of radial movement around the linear axis when the lever is moved from the at least one engaged position to the one or a plurality of disengaged positions.

In some embodiments, the brake system is configured for reducing the speed or stopping movement of a at least one drum wheel positioned proximate to the brake system and oppositely facing at least one support plate between which a material support cylinder is positioned for mounting a roll of wrapping material, wherein the brake system is configured for reducing the speed or stopping movement of the roll of wrapping material in a plurality of engaged and disengaged conditions comprising: a first engaged position whereby the lever is in the at least one engaged position, the spring is in an active position, the counterwheel is in operable contact with the roll of wrapping material, the feed plate is in the passive position, and the brake pad is in operable contact with the at least one drum wheel; a first disengaged position whereby the lever is in the at least one engaged position, the spring is in an active position, the counterwheel is in operable contact with the roll of wrapping material, the feed plate is in an active position, and the brake pad is not in operable contact with the at least one drum wheel; and a second disengaged position whereby the lever is in the at least one disengaged position, the spring is in a at least one passive position, the counterwheel is not in operable contact with the roll of wrapping material, and the brake pad is not in operable contact with the at least one drum wheel.

In some embodiments, the roll of wrapping material exacts contact and pressure to the counterwheel when the lever is in the at least one engaged position, such that, as the roll of wrapping material is being dispensed, an amount of pressure being exerted to the counterwheel is decreased, causing the brake pad to exert less pressure on the drum wheel of the material support cylinder, and allowing faster rotation of the roll of wrapping material and a steady amount of dispensing of the wrapping material.

In some embodiments, the harvester further comprises a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the harvester further comprises a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the harvester further comprises a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm; and a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

Aspects of the invention relate to a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the spring maintains a tension between the at least one lever plate and the at least one lever lock arm such that the at least one lever lock arm is maintained in its locked position.

In some embodiments, the at least one lever release arm is not in operable contact with the at least one lever lock arm in one or a plurality of disengaged positions; wherein the at least one release arm is in operable contact with the at least one lever lock arm in an unlocked position; and wherein the at least one release arm in the unlocked position exacts a force on the at least one lever lock arm such that the at least one lever lock arm is moved from its locked position to its unlocked position.

In some embodiments the lever plate system is configured for occluding the opening in at least one notch in at least one support plate, such that at least one material support cylinder contained in the at least one notch is prevented from pivoting away from the at least one support plate; wherein the lever plate system is configured for occluding and exposing the opening in at least one notch in a plurality of engage and disengaged conditions comprising: a first engage position whereby the at least one lever plate is in the closed position, the at least one lever lock arm is in the locked position, and the at least one release arm is not in operable contact with the at least one lever lock arm; and a first disengaged position whereby the at least one lever plate is in the open position, the at least one lever lock arm is in the unlocked position, and the at least one release arm is in operable contact with the at least one lever lock arm.

Aspects of the invention relate to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis; a pair of oppositely facing frame plates; a lock mechanism; at least one feed roller; and a feed plate; wherein the at least two material support cylinders are operably attached to at least the first support plate; wherein the at least two material support cylinders are configured for supporting rolls of wrapping material, and optionally loading or unloading a roll of wrapping material at the first radial position around the support axis; and wherein at least one radial position of at least one material support cylinder is configured for dispensing wrapping material; and a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the spring maintains a tension between the at least one lever plate and the at least one lever lock arm such that the at least one lever lock arm is maintained in its locked position.

In some embodiments, the at least one lever release arm is not in operable contact with the at least one lever lock arm in one or a plurality of disengaged positions; wherein the at least one release arm is in operable contact with the at least one lever lock arm in an unlocked position; and wherein the at least one release arm in the unlocked position exacts a force on the at least one lever lock arm such that the at least one lever lock arm is moved from its locked position to its unlocked position.

In some embodiments the lever plate system is configured for occluding the opening in at least one notch in at least one support plate, such that at least one material support cylinder contained in the at least one notch is prevented from pivoting away from the at least one support plate; wherein the lever plate system is configured for occluding and exposing the opening in at least one notch in a plurality of engage and disengaged conditions comprising: a first engage position whereby the at least one lever plate is in the closed position, the at least one lever lock arm is in the locked position, and the at least one release arm is not in operable contact with the at least one lever lock arm; and a first disengaged position whereby the at least one lever plate is in the open position, the at least one lever lock arm is in the unlocked position, and the at least one release arm is in operable contact with the at least one lever lock arm.

In some embodiments the wrapping mechanism further comprises a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the wrapping mechanism further comprises a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the wrapping mechanism further comprises a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element; and a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

Aspects of the invention also relate to a harvester comprising: at least a first bale chamber; a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis; a pair of oppositely facing frame plates; a lock mechanism; at least one feed roller; and a feed plate; wherein the at least two material support cylinders are operably attached to at least the first support plate; wherein the at least two material support cylinders are configured for supporting rolls of wrapping material, and optionally loading or unloading a roll of wrapping material at the first radial position around the support axis; and wherein at least one radial position of at least one material support cylinder is configured for dispensing wrapping material; and a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the spring maintains a tension between the at least one lever plate and the at least one lever lock arm such that the at least one lever lock arm is maintained in its locked position.

In some embodiments, the at least one lever release arm is not in operable contact with the at least one lever lock arm in one or a plurality of disengaged positions; wherein the at least one release arm is in operable contact with the at least one lever lock arm in an unlocked position; and wherein the at least one release arm in the unlocked position exacts a force on the at least one lever lock arm such that the at least one lever lock arm is moved from its locked position to its unlocked position.

In some embodiments the lever plate system is configured for occluding the opening in at least one notch in at least one support plate, such that at least one material support cylinder contained in the at least one notch is prevented from pivoting away from the at least one support plate; wherein the lever plate system is configured for occluding and exposing the opening in at least one notch in a plurality of engage and disengaged conditions comprising: a first engage position whereby the at least one lever plate is in the closed position, the at least one lever lock arm is in the locked position, and the at least one release arm is not in operable contact with the at least one lever lock arm; and a first disengaged position whereby the at least one lever plate is in the open position, the at least one lever lock arm is in the unlocked position, and the at least one release arm is in operable contact with the at least one lever lock arm.

In some embodiments the harvester further comprises a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the harvester further comprises a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the harvester further comprises a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element; and a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

Aspects of the invention relate to a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the at least one material support cylinder is capable of rotation around the linear material axis; and wherein the at least one material support cylinder is optionally connected to the at least one support plate by a pivoting element.

In some embodiments, the locking tab in a locked position is in operable contact with the at least one drum plate such that the locking tab prevents the at least one drum plate and the at least one material support cylinder from rotating around the linear material axis; wherein the locking tab in an unlocked position is not in operable contact with the at least one drum plate, allowing the at least one drum plate and the at least one material support cylinder to rotate around the linear material axis. In some embodiments, the tension tab maintains a tension between the at least one support plate and the locking tab such that the locking tab is maintained in its locked position.

In some embodiments, the drum lock system, operable in a plurality of positions comprises: at least one disengaged position whereby the at least one cam tab is not in operable contact with the at least one locking tab mechanism in one or a plurality of locked disengaged positions; at least one engaged position whereby the at least one cam tab is in operable contact with the at least one locking tab mechanism in an engaged position; and wherein the at least one cam tab in the engaged position exacts a force on the at least one locking tab mechanism such that the locking tab is moved from its locked position to its unlocked position.

Aspects of the invention relate to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis; a pair of oppositely facing frame plates; a lock mechanism; at least one feed roller; and a feed plate; wherein the at least two material support cylinders are operably attached to at least the first support plate; wherein the at least two material support cylinders are configured for supporting rolls of wrapping material, and optionally loading or unloading a roll of wrapping material at the first radial position around the support axis; and wherein at least one radial position of at least one material support cylinder is configured for dispensing wrapping material; and a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the at least one material support cylinder is capable of rotation around the linear material axis; and wherein the at least one material support cylinder is optionally connected to the at least one support plate by a pivoting element.

In some embodiments, the locking tab in a locked position is in operable contact with the at least one drum plate such that the locking tab prevents the at least one drum plate and the at least one material support cylinder from rotating around the linear material axis; wherein the locking tab in an unlocked position is not in operable contact with the at least one drum plate, allowing the at least one drum plate and the at least one material support cylinder to rotate around the linear material axis. In some embodiments, the tension tab maintains a tension between the at least one support plate and the locking tab such that the locking tab is maintained in its locked position.

In some embodiments, the drum lock system, operable in a plurality of positions comprises: at least one disengaged position whereby the at least one cam tab is not in operable contact with the at least one locking tab mechanism in one or a plurality of locked disengaged positions; at least one engaged position whereby the at least one cam tab is in operable contact with the at least one locking tab mechanism in an engaged position; and wherein the at least one cam tab in the engaged position exacts a force on the at least one locking tab mechanism such that the locking tab is moved from its locked position to its unlocked position.

In some embodiments, the wrapping mechanism further comprises a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the wrapping mechanism further comprises a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the wrapping mechanism further comprises: a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element; and a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

Aspects of the invention relate to a harvester comprising: at least one bale chamber; a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis; a pair of oppositely facing frame plates; a lock mechanism; at least one feed roller; and a feed plate; wherein the at least two material support cylinders are operably attached to at least the first support plate; wherein the at least two material support cylinders are configured for supporting rolls of wrapping material, and optionally loading or unloading a roll of wrapping material at the first radial position around the support axis; and wherein at least one radial position of at least one material support cylinder is configured for dispensing wrapping material; and a drum lock system comprising: at least one sidewall; at least one support plate; at least one material support cylinder, operably connected to the at least one support plate, comprising a material support arm that defines a linear material axis, and at least one drum plate positioned at or proximate to one end of and operably linked to the material support arm; at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

In some embodiments, the at least one material support cylinder is capable of rotation around the linear material axis; and wherein the at least one material support cylinder is optionally connected to the at least one support plate by a pivoting element.

In some embodiments, the locking tab in a locked position is in operable contact with the at least one drum plate such that the locking tab prevents the at least one drum plate and the at least one material support cylinder from rotating around the linear material axis; wherein the locking tab in an unlocked position is not in operable contact with the at least one drum plate, allowing the at least one drum plate and the at least one material support cylinder to rotate around the linear material axis. In some embodiments, the tension tab maintains a tension between the at least one support plate and the locking tab such that the locking tab is maintained in its locked position.

In some embodiments, the drum lock system, operable in a plurality of positions comprises: at least one disengaged position whereby the at least one cam tab is not in operable contact with the at least one locking tab mechanism in one or a plurality of locked disengaged positions; at least one engaged position whereby the at least one cam tab is in operable contact with the at least one locking tab mechanism in an engaged position; and wherein the at least one cam tab in the engaged position exacts a force on the at least one locking tab mechanism such that the locking tab is moved from its locked position to its unlocked position.

In some embodiments, the harvester further comprises a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element.

In some embodiments, the harvester further comprises a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

In some embodiments, the harvester further comprises: a brake system comprising: at least one elongated member comprising a longitudinal axis, that defines a linear axis around which at least a first, a second, and a third non-coaxial elements are capable of movement; at least one coaxial element that is capable of rotation around the linear axis; a lever, operable in at least one engaged position and at least one or a plurality of disengaged positions, comprising at least a first and a second end, said first end proximate to and in operable contact with the elongated member, configured for rotational movement of the elongated member in the one or a plurality of disengaged positions; the first non-coaxial element extending transversely from the linear axis and attached to a least one counterwheel configured for exacting contact and pressure to a roll of wrapping material; the second non-coaxial element extending transversely from the linear axis comprising at least one end operably linked to the at least one coaxial element; the third non-coaxial element extending transversely from the linear axis positioned at or proximate to one end of and operably linked to the at least one coaxial element and operably connected to at least one brake pad; a spring, positioned between the first and second non-coaxial elements, operably linking at least one end of the first and second non-coaxial elements; and optionally, a hooked element comprising at least one curved member and at least one straight member, operably linked to and positioned at or proximate to one end of the at least one coaxial element; and a lever plate system comprising: at least one lever plate operably attached to at least one support plate at a first pivot point, wherein the at least one lever plate occludes an opening in at least one notch in the at least one support plate in a closed position and exposes the opening in at least one notch in the at least one support plate in an open position; at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position; at least one spring, operably connected to the at least one lever plate and the at least one lever lock arm; and at least one release arm configured for operable contact with the at least one lever lock arm.

Aspects of the invention also relate to a method of loading and unloading a roll of wrapping material onto a wrapping mechanism of a harvester comprising: (a) moving a brake system to a disengaged position; (b) moving a lever plate system to a disengaged position; (c) pivoting at least one material support cylinder away from a notch in a support plate; (d) loading or unloading a roll of wrapping material onto the at least one material support cylinder.

Aspects of the invention also relate to a method of dispensing net wrap material into a bale chamber of a harvester comprising: (a) loading a roll of wrapping material onto a wrapping mechanism; (b) moving a drum lock system to a disengaged position; (c) dispensing wrapping material from the roll of wrapping material into a feed plate of the wrapping mechanism Aspects of the invention also relate to a method of dispensing a constant or substantially constant amount of wrapping material into a bale chamber of a harvester comprising: (a) loading a roll of wrapping material onto a material support cylinder of a wrapping mechanism; (b) moving a drum lock system to a disengaged position; (c) moving a brake system to an engaged position, such that a brake pad applies variable pressure on a drum wheel of the material support cylinder; (d) dispensing wrapping material from the roll of wrapping material into a feed plate of the wrapping mechanism

DETAILED DESCRIPTION OF THE INVENTION

Figure 1:
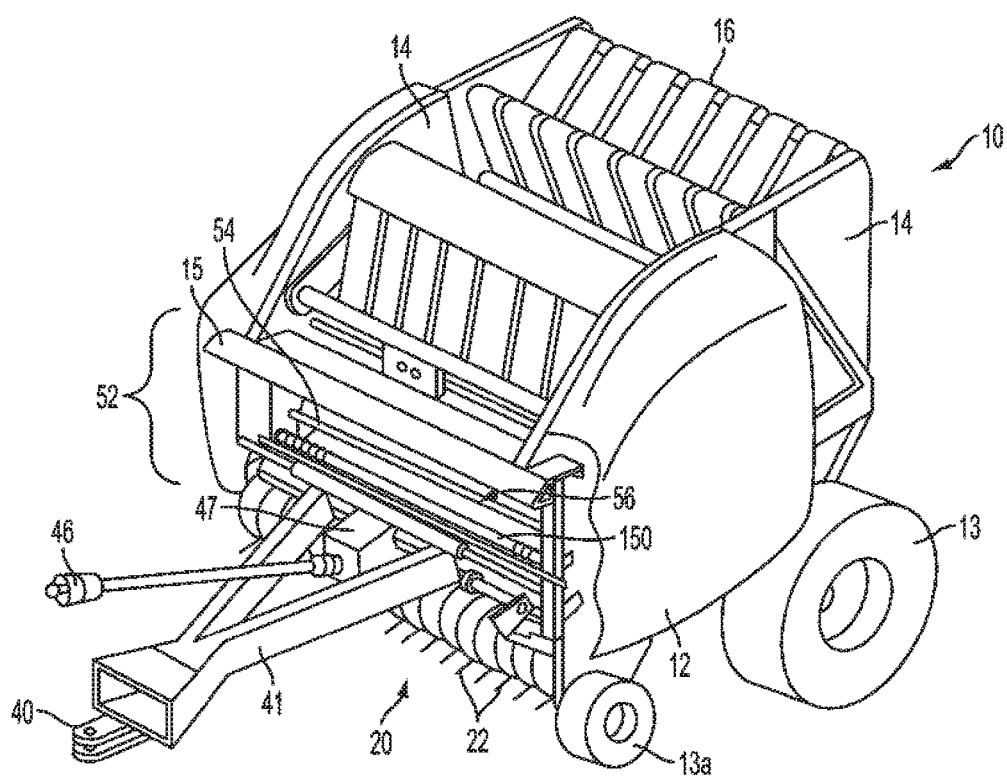
FIG. 1 depicts a static image of a baler without multiple material support cylinder.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The term "harvester" as used herein is defined as a machine designed to consolidate and/or package material so as to facilitate the storage and handling of the material for later use. In some embodiments, the harvester is used to harvest agricultural material. In some embodiments, the harvester is an agricultural baler, a waste baler, or a combine comprising a baling mechanism.

The term "material" as used herein is defined as a numerous individual items that are harvested or collected by the harvester. In some embodiments, the material is agricultural crop, such as hay or cotton. In some embodiments, the material is biomass.

The term "harvesting assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. P320130305683 A1 that illustrates such mechanisms, the disclosures of which are incorporated herein by reference in their entirety.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "wrapping mechanism" as used herein is defined as a mechanical device or assembly that uses wrapping material to wrap a formed bale. In some embodiments, the net wrapping mechanism comprises at least two material support cylinders, a mechanism support cylinder, a first and a second support plate, at least one drive mechanism, a pair of oppositely facing frame plates, a lock mechanism, a brake system, at least one feed roller, and a feed plate. In some embodiments, the material support cylinders, mechanism support cylinder, and the first and second support plate can revolve around a support axis. In some embodiments, wrapping material is passed around the at least one feed roller through the feed plate. In some embodiments, the wrapping mechanism is positioned within the interior of a harvester.

The term "wrapping material" as used herein is defined as a net, mesh, twine, plastic film, or other material that is used for the wrapping of a bale in order to maintain the shape and density of said bale and optionally protect it from weather or other external conditions.

The term "material support cylinder" as used herein is defined as an elongated member, including, for example, a rod or tube configured for supporting a roll of wrapping material. In some embodiments, the roll of wrapping material is capable of rotating about the material support cylinder on the material support cylinder axis. In some embodiments, the material support cylinder is capable of pivoting away from a sidewall. In some embodiments, the material support cylinder is capable of pivoting away from the axis upon which the roll of wrapping material rotates when the material support cylinder is in its net wrapping position. In some embodiments, the material support cylinder is capable of pivoting away from a sidewall to a position where a roll of wrapping material may be loaded or unloaded from the material support cylinder. In some embodiments, the material support cylinder is not operably connected to a ramp-shaped lifting member or another type of member that can engage with a brake pad, brake arm, or another member of a brake system.

The term "mechanism support cylinder" as used herein is defined as a rod or tube configured for supporting elements of the wrapping mechanism. In some embodiments, the mechanism support cylinder supports a first and a second support plate, at least two material support cylinders, and optionally, at least two rolls of wrapping material mounted on the at least two material support cylinders. In some embodiments, the mechanism support cylinder rotates about a support axis.

The term "support plate" as used herein is defined as a notched, drilled or solid plate that is configured for the support of a material support cylinder. In some embodiments, the wrapping mechanism contains a first and a second support plate. In some embodiments, the first and the second support plate are operably attached to a mechanism support cylinder. In some embodiments, the first and the second support plate rotate around the support axis in a plurality of positions.

The term "support axis" as used herein is defined as a linear axis around which the material support cylinders of the wrapping mechanism revolve. In some embodiments, at least two support plates, and a mechanism support cylinder rotate around the support axis. In some embodiments, the mechanism support cylinder is positioned on the support axis. For purposes of this specification, the term "rotate" means movement in a non-linear path about an internal axis. The term "revolve" movement in a non-linear path about central axis not necessarily positioned internally as compared to the moving object.

The term "drive mechanism" as used herein is defined as a device, assembly, or mechanism that facilitates the rotation and/or revolution of a support plate around the support axis. In some embodiments, the drive mechanism is a motor and/or mechanical drive device that facilitates the rotation and/or revolution of a support plate around the support axis. In some embodiments, the drive mechanism is a handle or type of gripping and/or assisting device that assists an operator in the manual revolution of a support plate around the support axis. In some embodiments, the drive mechanism drives the revolution of at least two material support cylinders around the support axis. In some embodiments, the drive mechanism drives the rotation of a first and a second support plate and a mechanism support cylinder around the support axis. In some embodiments, the drive mechanism is operated by and in electronic communication with a controller.

The term "brake system" as used herein is defined as a device or assembly that prevents the revolution of a roll of wrapping material around the support axis. In some embodiments the brake system is configured to apply and release variable tension to a roll of wrapping material supported on a material support cylinder, and controls the rate at which wrapping material is dispensed from a roll of wrapping material. In some embodiments, the brake system comprises a brake arm, a brake handle, a spring, a counter wheel, and a brake pad. In some embodiments, the brake system does not comprise an actuator for the movement of the brake pad. In some embodiments, the brake system does not comprise an actuator for the movement of any component of the brake system. In some embodiments, the brake system can be moved to a position where it does not prevent the revolution of a roll of wrapping material around the support axis.

Braking systems are known in the agricultural industry. Reference is made, for example, to U.S. Pat. No. 6,651,408 that illustrates such a system, the disclosures of which are incorporated herein by reference in their entirety. While the primary purpose of such a system is to control the rate at which wrapping material is dispensed from a roll of wrapping material during the wrapping process, such systems are also static and incapable of moving to a position where it would not obstruct the revolution of the material support cylinders. Embodiments of the present invention require a brake system that is capable of both controlling the rate at which wrapping material is removed from a roll of wrapping material and moving to a position where the system will not obstruct the revolution of the material support cylinders during the indexing process.

The term "lock mechanism" as used herein is defined as a device or assembly that mechanically prevents the rotation of the mechanism support cylinder around the support axis. In some embodiments, the lock mechanism comprises a lock gear and a lock pin, wherein the lock pin may pass through one or a plurality of holes in the lock gear. In some embodiments, the lock gear is operably connected to a mechanism support cylinder. In some embodiments, the lock gear and mechanism support cylinder are rotatable about a support axis. In some embodiments, the lock gear is positioned between a support plate and frame plate, wherein the frame plate has one hole through which a lock pin may pass. In some embodiments, the lock pin passes through the one hole in the frame plate, and also through at least one hole in the lock gear that prevents the lock gear from rotating about a support axis.

The term "lever plate system" as used herein is defined as a device or assembly that mechanically prevents the pivoting of a material support cylinder away from the axis upon which it rotates. In some embodiments, the lever plate system prevents the pivoting of a material support cylinder away from the axis upon which it rotates and/or prevents the pivoting of a material support cylinder out of a notch in a support plate in which the material support cylinder occupies in a locked position. In some embodiments, the lever plate system comprises a lever plate that occludes the opening of the notch. In some embodiments, the lever plate is attached to the support plate by a pivot point. In some embodiments, the lever plate system also comprises a lever lock arm that locks the lever plate into a position that occludes the notch. In some embodiments, the lever plate and the lever lock arm are operably connected by a spring. In some embodiments, the lever plate system also comprises a lever release arm that is capable of moving the lever lock arm to a position where it does not lock the lever plate. In some embodiments, the lever release arm is attached to a brake system. In some embodiments, a wrapping mechanism comprises one or a plurality of notches, lever plates, and lever lock arms. In some embodiments, the wrapping mechanism comprises one lever release arm. In some embodiments, the wrapping mechanism comprises at least one lever release arm.

The term "drum lock system" as used herein is defined as a device or assembly that mechanically prevents the rotation of the material support cylinder around its own axis. In some embodiments, the drum lock system comprises a locking tab and a tension tab, wherein the locking tab may pass through one or a plurality of holes in a drum wheel of a material support cylinder. In some embodiments, the drum lock system comprises a locking tab and a tension tab, wherein the locking tab passes through one of at least two, three, four, five or six holes in a drum wheel of a material support cylinder. In some embodiments, the tension tab maintains a tension such that the locking tab is engaged with a drum wheel such that the material support cylinder may not rotate around its own axis. In some embodiments, the locking tab is operably connected to a support plate. In some embodiments, a cam tab positioned on a sidewall is capable of coming in operable contact with the locking tab as the support plate and material support cylinder rotate to a dispensing position. In some embodiments, the cam tab is capable of releasing the locking tab, allowing the material support cylinder to rotate around its axis.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine. In some embodiments, the combine comprises a baling mechanism.

The present invention relates to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve; and at least one drive mechanism operably connected to at least the first support plate such that the movement of the drive mechanism drives the revolution of the at least two material support cylinders from a first position to one or more radial positions around the support axis; wherein the at least two material support cylinders are operably attached to at least the first support plate; wherein the at least two material support cylinders are configured for the support of wrapping material; and wherein at least one position of at least one material support cylinder is configured for the dispensing of wrapping material.

In accordance with the present invention, therefore, it is seen that by some embodiments described herein above, there is provided an adjustable force wrapping material brake mechanism and dispenser assembly for an agricultural baler having a mechanism support cylinder operably supporting at least two material support cylinders that have adjustable positions radial positions around the mechanism support cylinder, wherein, in at least one operable position, a roll of net wrapping material loaded or mounted on the material support cylinder is capable of dispensing wrap material into a bale chamber adjacent to or proximate to the net wrap system. In addition, the present invention comprises a brake system and lever plate system allows for methods of loading and unloading net wrap material whereby, turning a lever of the brake system, moves the brake system to a position that no longer occludes the path of the material support cylinder pivoting away from its axis and unlocks the lever plate. In addition, the present invention allows for methods of dispensing wrap material when the brake system is in an engaged position and the drum lock is removed. When a material support cylinder supporting a net wrap material is in a dispensing position and when the brake system is in an engaged position, wrapping material may be dispensed in a constant or substantially constant rate by rotation of the roll of net wrapping material. According to some embodiments, the net wrapping mechanism comprising any of the brake systems disclosed herein allows revolution of a plurality of material support cylinders about a support axis, each material support cylinder independently rotatable about its axis positioned between sidewalls and drum wheels, and each material support cylinder optionally comprising a drum lock mechanism disclosed herein.

In some embodiments, the invention relates to methods of indexing a material support cylinder from a non-dispensing position to a dispensing position, wherein the dispensing position allows for a roll of net wrap material to be fed into a feed plate adjacent to or proximate to a bale chamber.

FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13*a*, and mounted to the mainframe 12, is the pickup 20. The pickup 20 is supported by the pair of front wheels 13*a*. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 2:
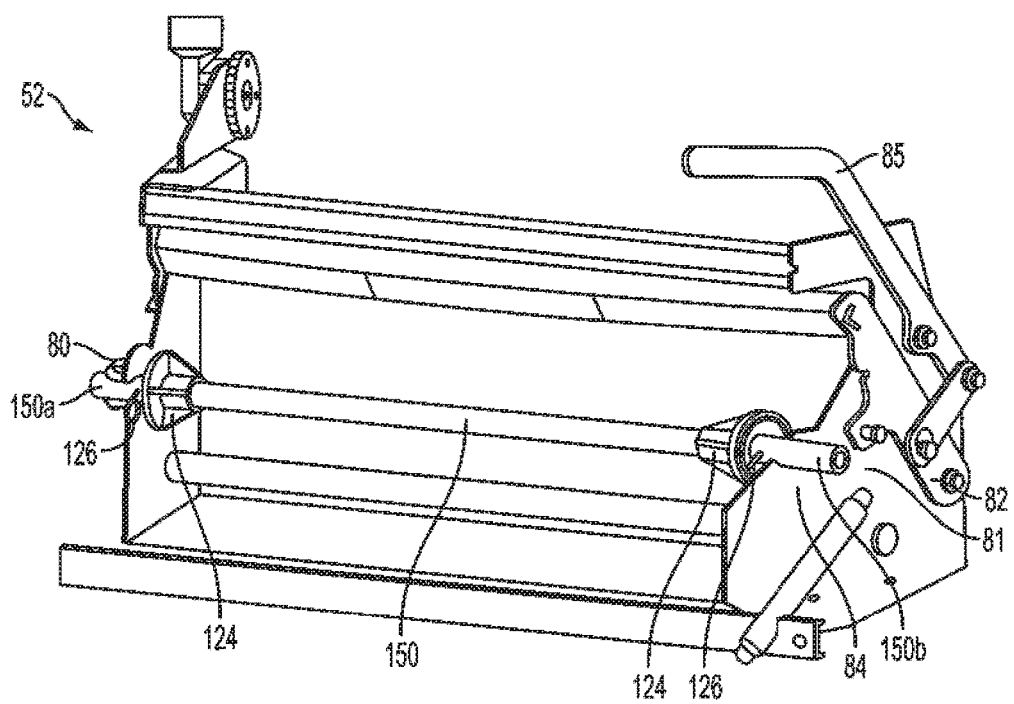
FIG. 2 depicts a diagram of a wrapping device without multiple material support cylinders.

FIG. 2 depicts a front-facing view of a material support cylinder 150 in a traditional wrapping assembly 52. The single material support cylinder 150 is capable of rotating towards and away from the wrapping assembly 52 by pivot connection 80 for the conventional installation of a wrapping material roll. The first end 150*a* of the material support cylinder 150 is connected to the pivot connection 80 and the other facing the arm lock connection 81. One some material support cylinders, guides 126 are placed along the cone base of the bearing, so that the bearing is forced flush against the guide when the bearing is installed into the opening of a roll of wrapping material. Some material support cylinders contain holes running linearly from the end of the support tube to the center. These often serve as connection points to place the guide 126 either closer or further from the center of the material support cylinder to enclose various sized (e.g. length) rolls of wrapping material.

Figure 3:
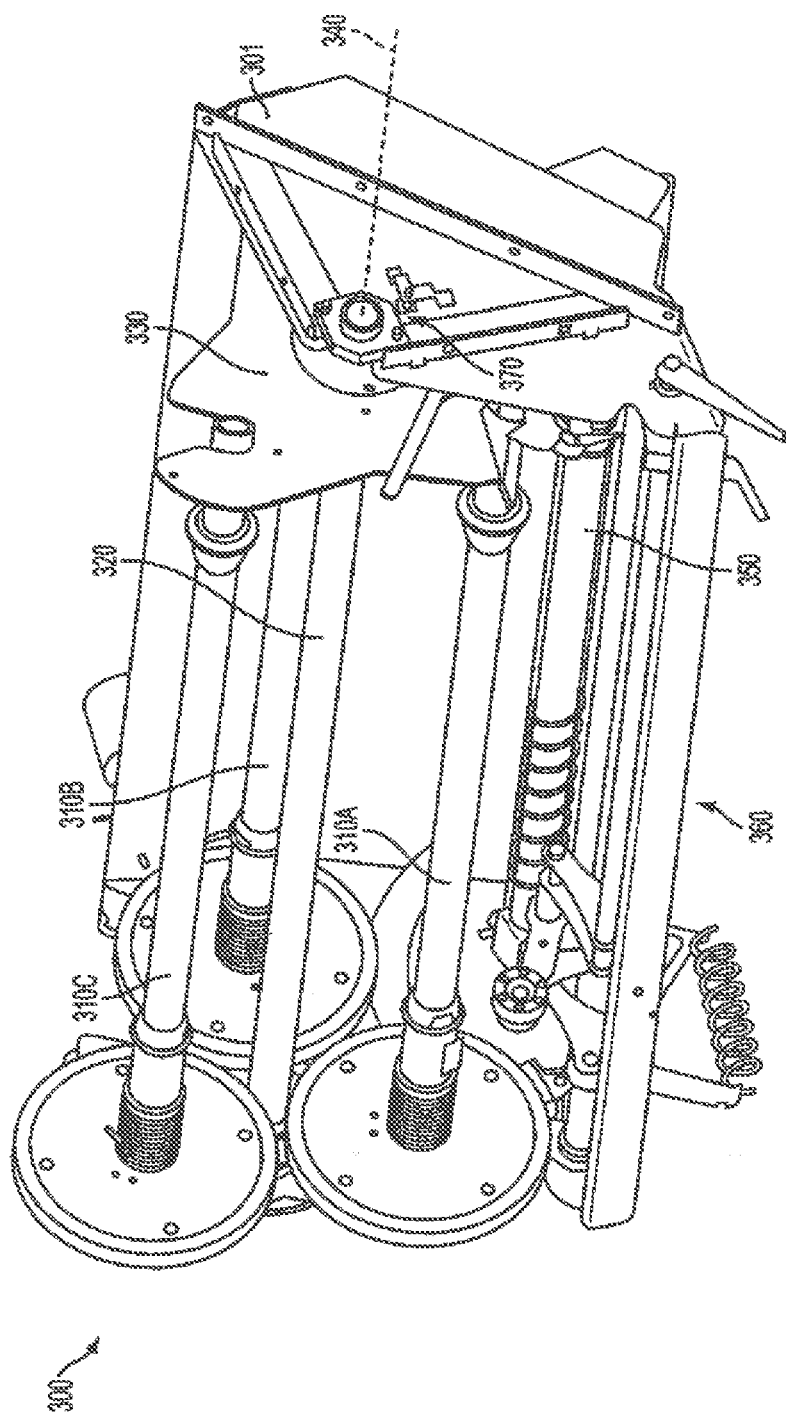
FIG. 3 depicts an embodiment of a multi-cylinder wrapping mechanism.

FIG. 3 depicts a wrapping mechanism, generally designated 300, that contains no rolls of wrapping material. A pair of frame plates, of which only one 301 is clearly visible, contain or support many of the elements of the wrapping mechanism, including three material support cylinders 310A, 310B and 310C, one mechanism support cylinder 320, and two support plates, of which only one 330 is clearly visible. The material support cylinders 310A, 310B, and 310C, the mechanism support cylinder 320, and the support plates 330 are all rotatable around a support axis 340. Other elements of the wrapping mechanism 300 include a feed roller 350, a brake system, generally designated 360, and a lock mechanism, generally designated 370. In this embodiment, the brake system 360 and lock mechanism 370 are shown in their first operable positions, which generally prevent the release of any material support cylinder or the rotation of any element around the support axis 340.

Figure 4:
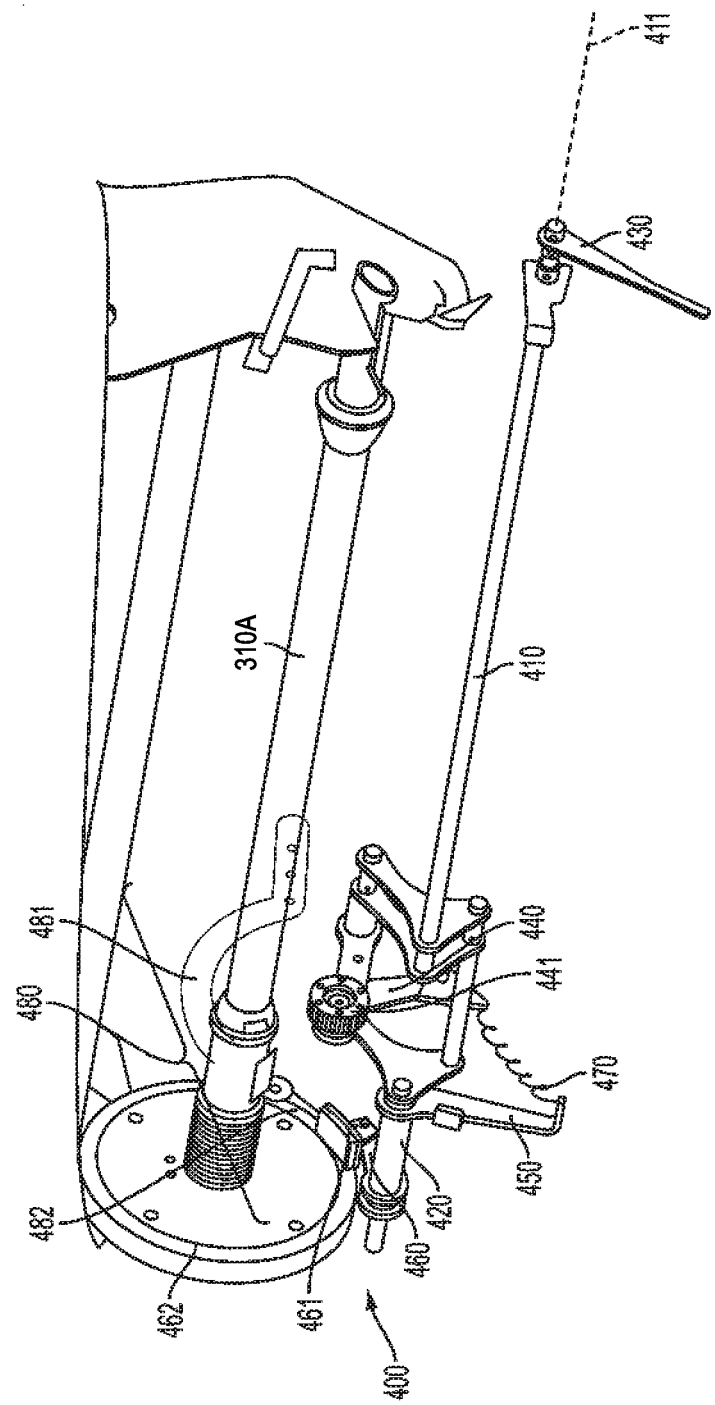
FIG. 4 depicts an embodiment of a brake system in an engaged position.

FIG. 4 depicts a brake system, generally designated 400, in an engaged position. An elongated member 410 defines a linear axis 411 that extends the length of the brake system. A coaxial element 420 is also on the linear axis 411. Connected to one end of the elongated member 410 is a lever 430 that is shown here in an engaged position. The brake system additionally consists of three non-coaxial elements. The first non-coaxial element 440 is not directly connected to either the elongated member 410 or the coaxial element 420, but it does support, in part, a counterwheel 441. The counterwheel 441 is designed to operably contact a roll of wrapping material (not shown) that is supported by a material support cylinder 310A. The second non-coaxial element 450 is connected at one end to the coaxial element 420. The other end of the second non-coaxial element 450 is operably connected to the first non-coaxial element 440 by a spring 470, which translates the movement of the first non-coaxial element 440 to the second non-coaxial 450 element when the brake system 400 is in an engaged position. The third non-coaxial element 460 is connected to the coaxial element 420 at one end and to a brake pad 461 at the other end. The brake pad 461 is designed to operably contact a drum wheel 462 that is a part of the material support cylinder 310A. The brake pad 461 is capable of applying pressure to the drum wheel 462, controlling, in part, the rotational speed of a roll of wrapping material on the material support cylinder 310A. Optionally, the brake system 400 can also comprise a hooked element 480 that consists of a straight member 482 and a curved member 481. The hooked element 480 is connected to a feed plate 431 of a wrapping system at one end and to the coaxial element 420 at the other end.

Figure 5:
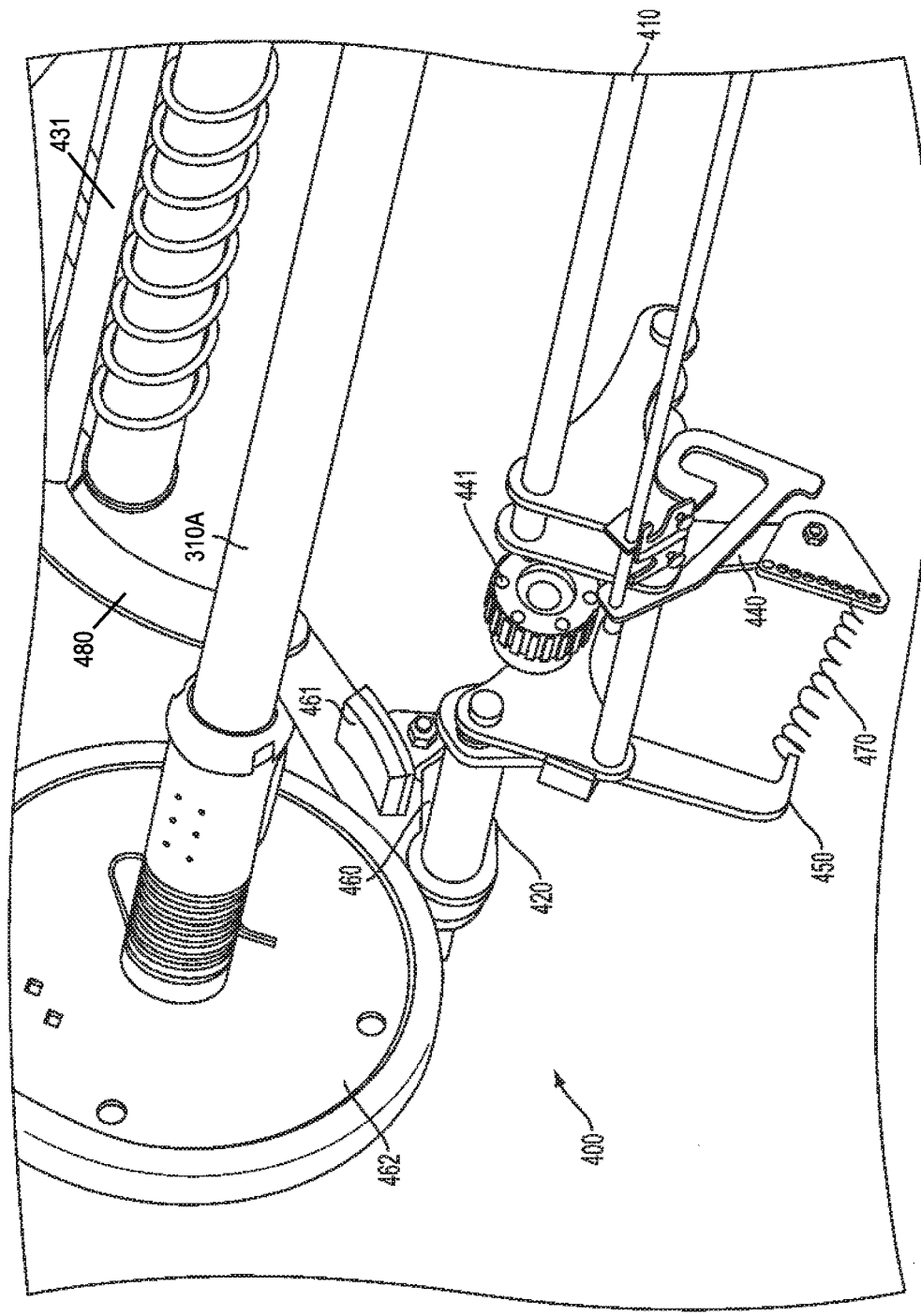
FIG. 5 depicts an embodiment of a brake system in a disengaged position.

FIG. 5 depicts the brake system 400 in a disengaged position. The elongated member 410 has been rotated by the lever (not shown) such that the first non-coaxial element 440 has been moved downward and away from the material support cylinder 310A, such that the counterwheel 441 would not come in operable contact with a roll of wrapping material if one where present on the material support cylinder 310A. In the position shown, the first non-coaxial element 440 is closer to the second non-coaxial element 450, causing a loss of tension in the spring 470. The coaxial element 420 is thus allowed freer rotation, causing the brake pad 461 of the third non-coaxial element 460 to become disengaged with the drum wheel 462 and allowing rotation of the material support cylinder 310A. The overall position of the brake system 400 shown here would also allow the revolution of one or a plurality of material support cylinders around a central support axis.

Figure 6:
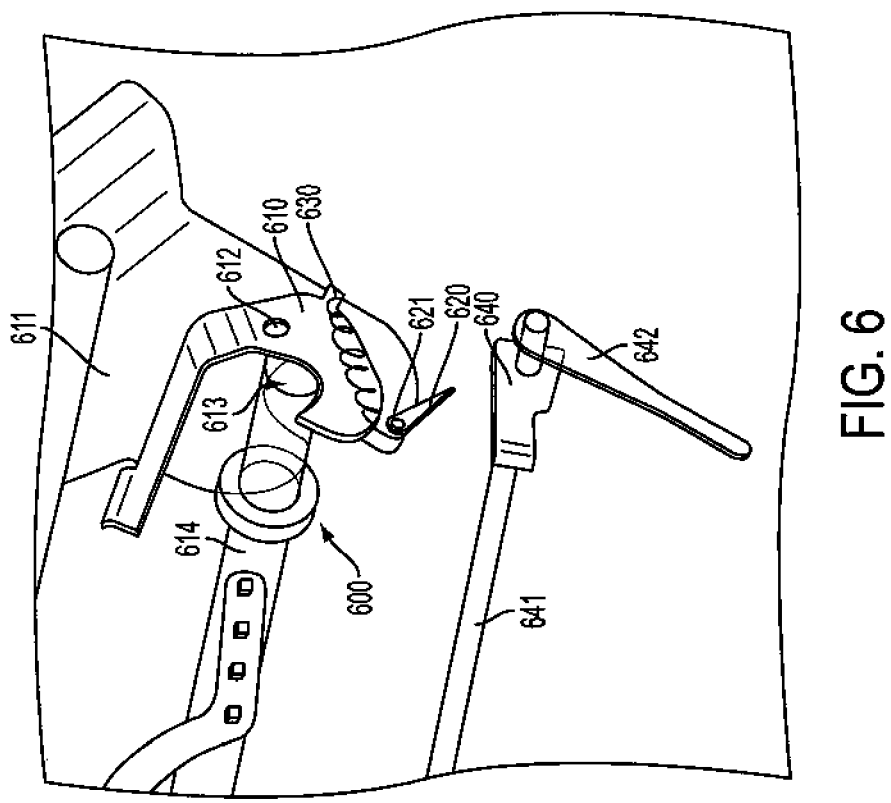
FIG. 6 depicts an embodiment of a lever plate system in a locked position.

FIG. 6 depicts a lever plate system, generally designated 600, in a locked position. A lever plate 610 is connected to a support plate 611 at a pivot point 612 such that in the closed position shown here the lever plate 610 occludes an opening in a notch 613 of the support plate 611, said notch 613 being designed to hold one end of a material support cylinder 614. Preventing the rotation of the lever plate 610 is a lever lock arm 620 which is also connected to the support plate 611 by a separate pivot point 621. In its locked position shown here, the lever lock arm 620 is operably in contact with the lever plate 610, preventing the rotation of the lever plate 610 around its pivot point 612. Maintaining the lever lock arm 620 in its locked position is a spring 621 that is connected to both the lever lock arm 620 and the lever plate 610. A release arm 640, shown here in a disengaged position, is not in operable contact with the lever lock arm 620. In this embodiment, the release arm 640 is operably connected with the elongated member 641 of the brake system, and the movement of the release arm 640 is controlled by the lever 642.

Figure 7:
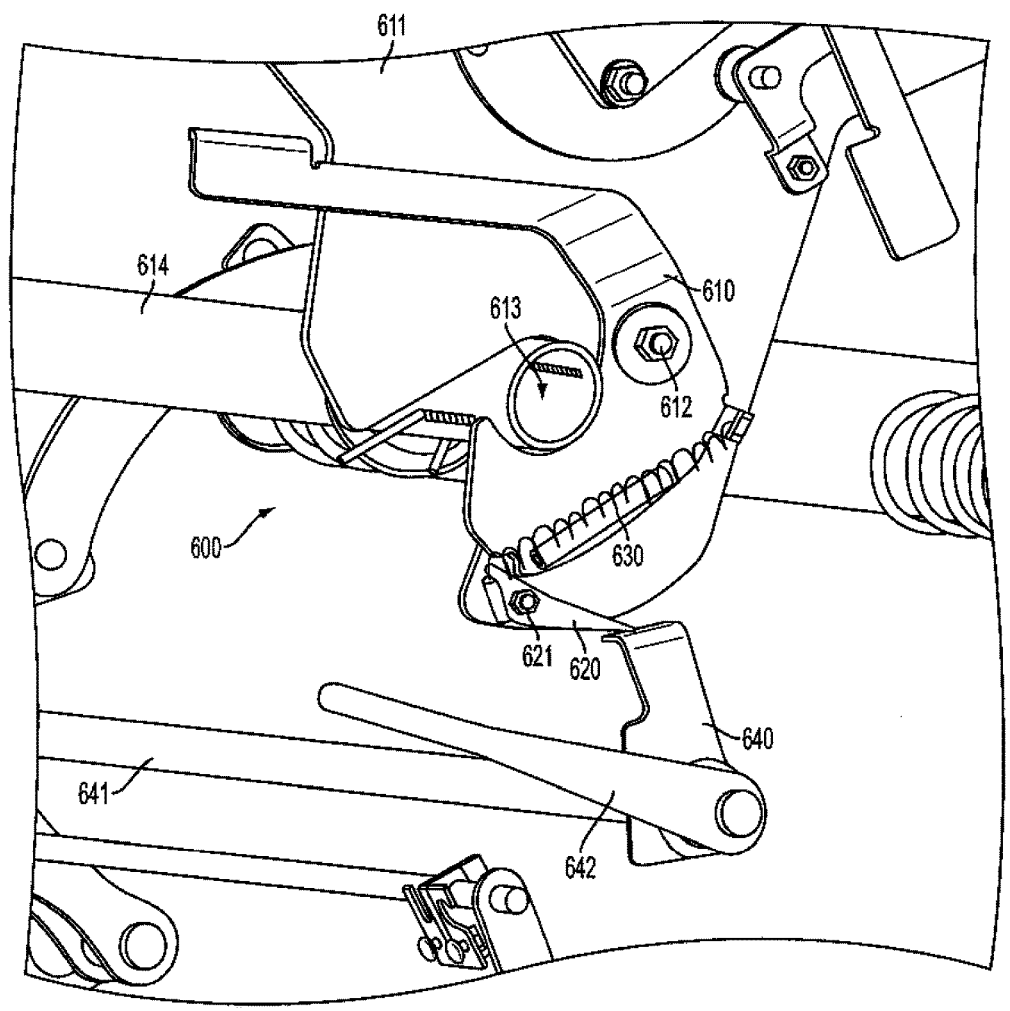
FIG. 7 depicts an embodiment of a lever plate system in an unlocked position.

FIG. 7 depicts the lever plate system 600 in an unlocked position. The lever 642 has been rotated such that the lever release arm 640 has been in a engaged position whereby it is in operable contact with the lever lock arm 620. The lever lock arm 620, in turn, has been pivoted around its pivot point 621 such that it is no longer in operable contact with the lever plate 610, as the force of the release arm 640 coming in contact with the lever lock arm 620 has overcome the retaining force of the spring 630. The lever plate 610 is now free to move around its pivot point 612, opening the notch 613 in the support plate 611 and allowing the material support cylinder 614 to pivot away from the notch 613.

Figure 8:
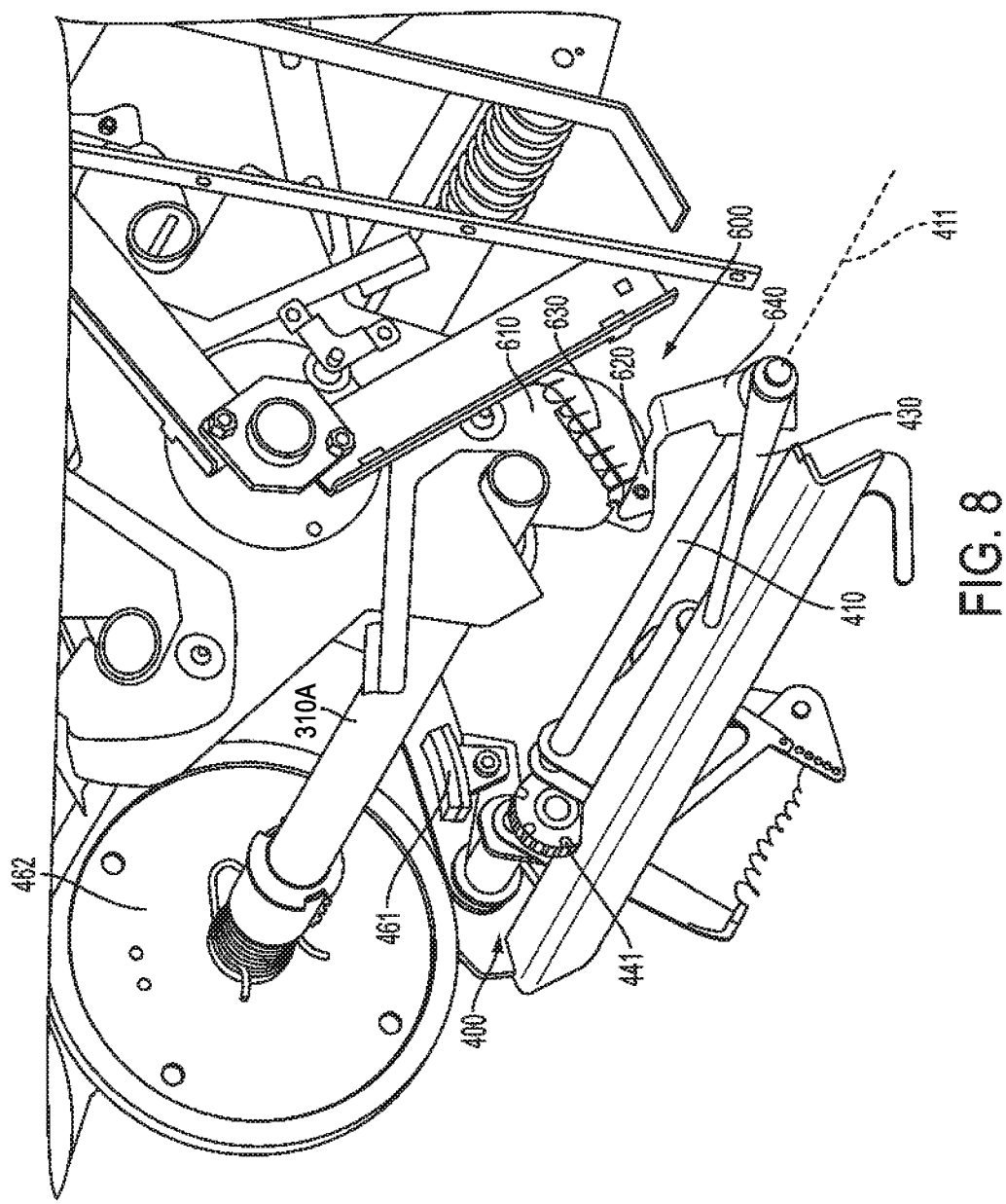
FIG. 8 depicts an embodiment of a brake system and lever plate system combined in a disengaged position.

FIG. 8 depicts a combined brake system and lever plate system in a disengaged/unlocked position. The brake system 400 is as described in FIG. 4, with an elongated member 410 defining a linear axis 411. The lever 430 is in a disengaged position, moving the counterwheel 441 away from the material support cylinder 310A, and moving the brake pad 461 away from the drum wheel 462. The position of the lever 430 also moved the release arm 640 of the lever plate system 600 to come in operable contact with lever lock arm 620 such that the lever plate 610 is free to move, allowing the material support cylinder 310A to pivot away from the support plate. The combination of the brake system 400 and the lever plate system 600 allows in part both the load/unloading of wrapping material onto the material support cylinder and the revolution of material support cylinder around the support axis of a multi-cylinder wrapping mechanism.

Figure 9:
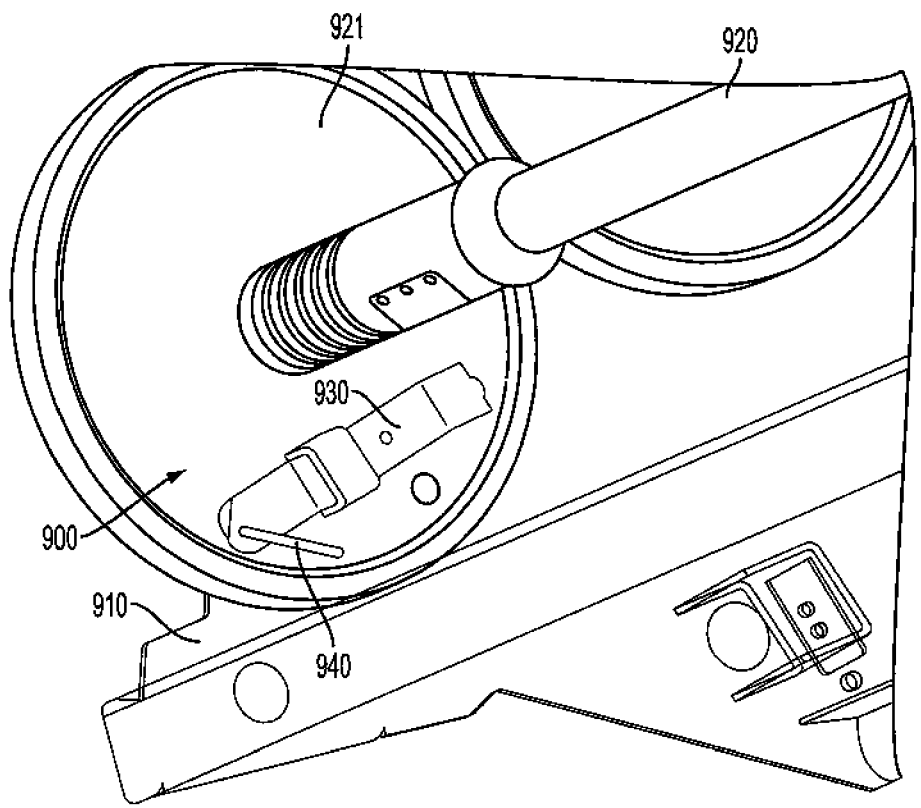
FIG. 9 depicts an embodiment of a drum lock system with a drum wheel in place.

FIG. 9 depicts a drum lock system, generally designated 900, comprising a sidewall 910 and a material support cylinder 920 with a drum wheel 921. A locking tab mechanism 930 is operably attached to a support plate (not shown) at one end and the drum wheel 921 at the other end, preventing the rotation of the drum wheel around an axis defined by the material support cylinder 920. A cam tab 940 is operably attached to the sidewall 910 at a fixed position, such that when the material support cylinder 920 is in the proper position, the cam tab 940 comes in operable contact with the locking tab mechanism 930, releasing contact between the locking tab mechanism 930 and the drum wheel 921.

Figure 10:
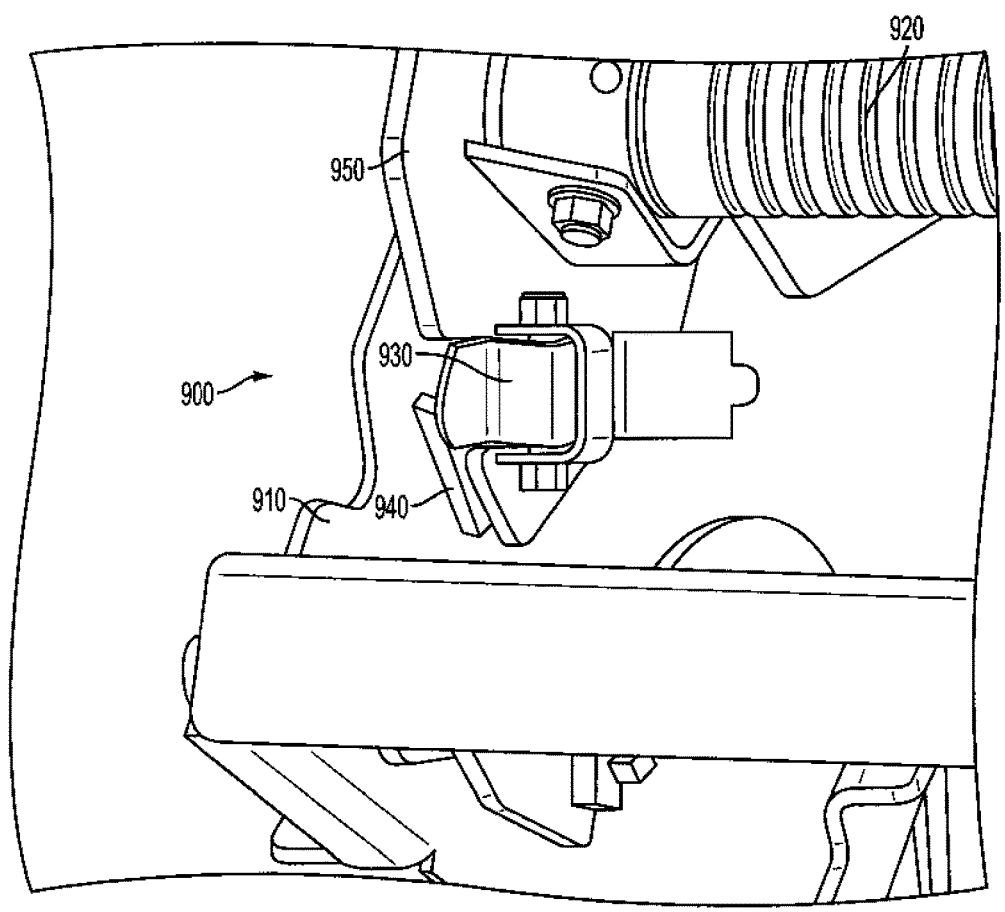
FIG. 10 depicts an embodiment of a drum lock system with a drum wheel removed.

FIG. 10 depicts the drum lock system 900 with the representation of the drum wheel of the material support cylinder 920 removed to more accurately show the locking tab mechanism 930. The cam tab 940 is more clearly shown attached to the sidewall 910. The locking tab mechanism 930 is operably attached to the support plate 950. In this position, the material support cylinder would be capable of rotation.

Figure 11:
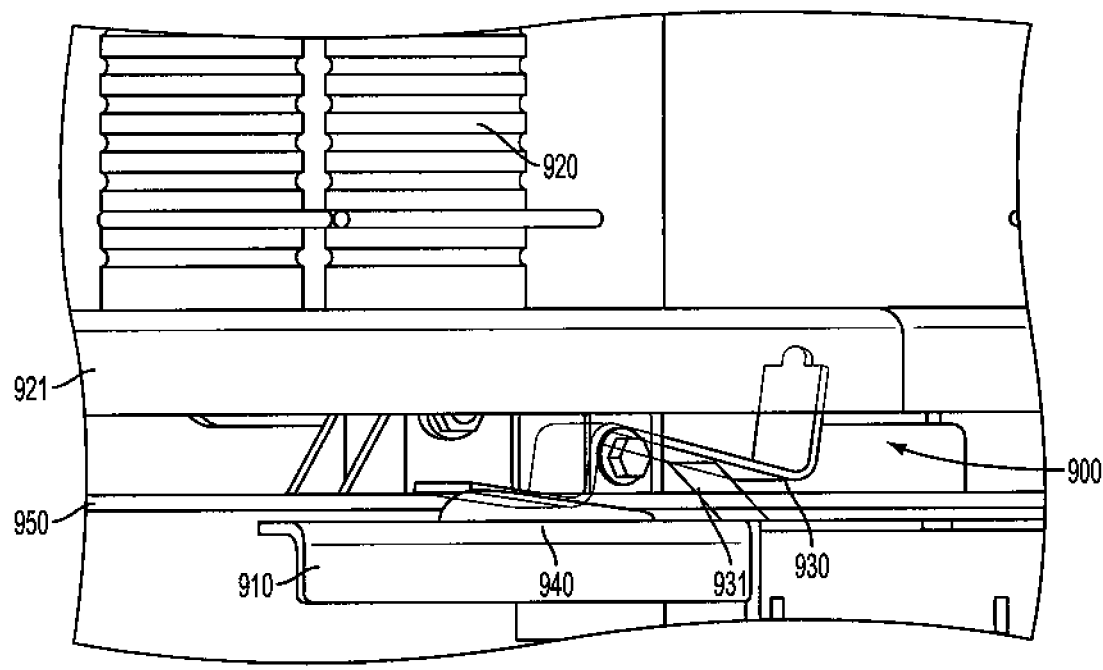
FIG. 11 depicts an embodiment of a drum lock system from a top-down perspective.

FIG. 11 depicts the drum lock system 900 from a top-down perspective. The cam tab 940 is shown operably connected with the sidewall 910. The material support cylinder 920 and drum wheel 921 are operable attached the support plate 950. In between the support plate 950 and the drum wheel 921 is the locking tab mechanism 930, shown here with a tension tab 931 which provides the force necessary to keep the locking tab mechanism 930 engaged with the drum wheel 921 when the locking tab mechanism 930 is not in operable contact with the cam tab 940.

Figure 12A:
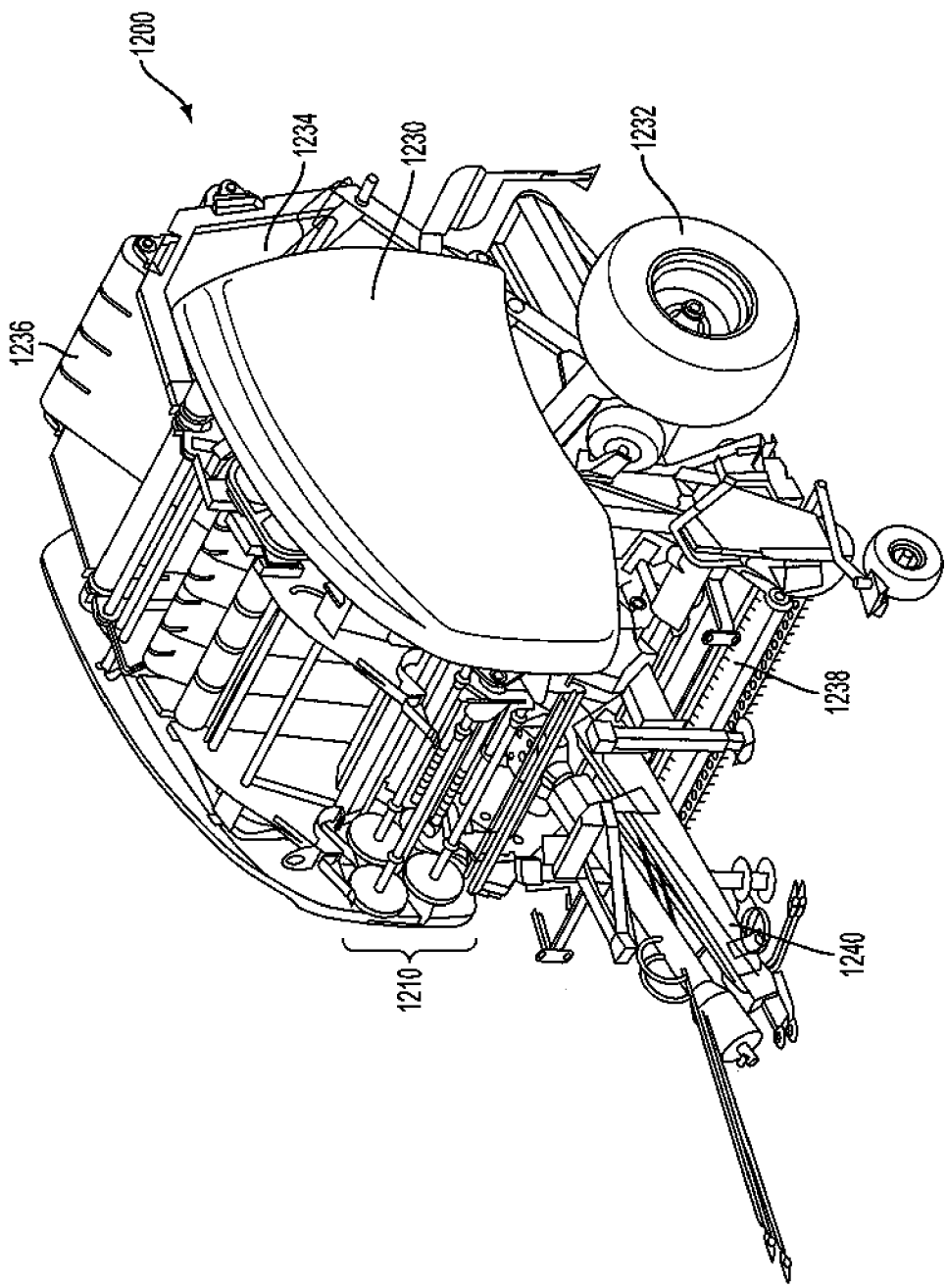
FIGS. 12A and 12B depict static images of an exemplary baler containing the multi-cylinder wrapping mechanism, including a brake system, a lever plate system, and a drum lock system.
Figure 12B:
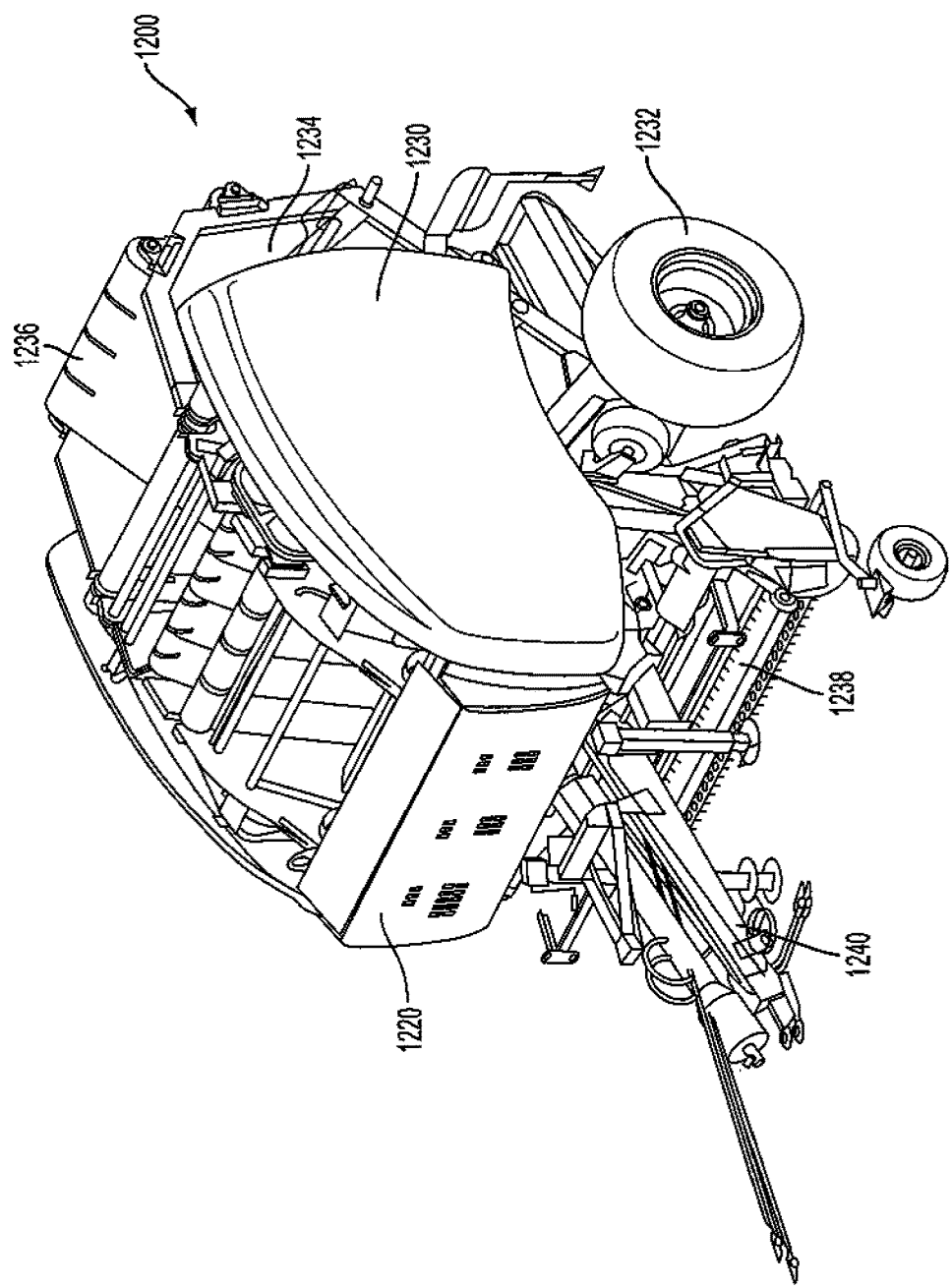

FIGS. 12A and 12B depict a static image of an exemplary round baler, generally designated 1200, containing the multi-cylinder wrapping mechanism generally described in FIGS. 3-11. The exemplary round baler 1200, similar to the round baler described in FIG. 1, comprises a main frame 1230 supported by a pair of rear wheels 1232, a pair of sidewalls 1234, a plurality of bailing belts 1236, a pickup mechanism 1238, and a forwardly mounted hitch 1240. In FIG. 12A, the exemplary round baler 1200 also contains the wrapping mechanism, generally designated 1210, in the forward section of the baler. In FIG. 12B, the exemplary round baler 400 is shown with an exterior access panel 1220 in a closed position covering the wrapping mechanism 1210. The disclosure relates to the contents of U.S. patent application filed Apr. 18, 2014, entitled Indexing Net Wrap System, invented by Scott Simmons, which is incorporated by reference in its entirety.

In some embodiments, the harvester comprises any of the disclosed brake systems, lever plate systems, and/or drum lock systems disclosed herein.

In some embodiments, the harvester and systems disclosed herein comprise a controller that operates and is in electronic communication with, a drive mechanism.

In some embodiments, the harvester and systems disclosed herein comprise at least one sensors at or proximate to the spring of the brake system.

Having described a series of embodiments, it will become apparent that various modifications can be made without departing from the scope of the invention as defined in the accompanying claims. Various publications, including patents, published applications, technical articles and scholarly articles are cited throughout the specification. Each of these cited publications is incorporated by reference herein, in its entirety

What is claimed is:

1. A wrapping mechanism comprising:

at least two material support cylinders, extending between a first and a second support plate and in operable contact with at least one of the first and second support plates, the at least two material support cylinders rotatably mounted around a support axis;

a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis;

a pair of oppositely facing frame plates; a lock mechanism; at least one feed roller; and a feed plate; wherein the at least two material support cylinders are operably attached to at least the first support plate;

wherein the at least two material support cylinders are configured for supporting rolls of wrapping material, and loading or unloading a roll of wrapping material at the first radial position around the support axis; and wherein at least one radial position of at least one material support cylinder is configured for dispensing wrapping material; and a brake system comprising:

at least one elongated member comprising a longitudinal axis, that defines a linear axis around which at least a first, a second, and a third non-coaxial elements are capable of movement;

at least one coaxial element that is capable of rotation around the linear axis;

a lever comprising at least a first and a second end, said first end proximate to and in operable contact with the elongated member, configured for rotational movement of the elongated member;

the first non-coaxial element extending transversely from the linear axis and attached to a least one counterwheel configured for exacting contact and pressure to a roll of wrapping material;

the second non-coaxial element extending transversely from the linear axis comprising at least one end operably linked to the at least one coaxial element;

the third non-coaxial element extending transversely from the linear axis positioned at or proximate to one end of and operably linked to the at least one coaxial element and operably connected to at least one brake pad;

a spring, positioned between the first and second non-coaxial elements, operably linking at least one end of the first and second non-coaxial elements; and a hooked element comprising at least one curved member and at least one straight member, operably linked to and positioned at or proximate to one end of the at least one coaxial element;

wherein the spring comprises a plurality of active and at least one non-active positions;

wherein in at least a first active position, the spring maintains a tension between the first and second non-coaxial elements such that movement or motion in the first non-coaxial element is transferred to the second non-coaxial element.

2. The wrapping mechanism of claim 1, wherein in at least a first non-active position, the spring releases the tension between the first and second non-coaxial elements.

3. The wrapping mechanism of claim 1, wherein the hooked element is operably linked to one end of the at least one coaxial member and comprises at least one curved member and at least one straight member.

4. The wrapping mechanism of claim 3, wherein the at least one curved member of the hooked element is attached to a feed plate capable of movement between an active and a passive position; wherein the active position of the feed plate applies tension on the hooked element such that the at least one coaxial element rotates around the linear axis; and wherein the passive position of the feed plate does not apply tension or applies a limited amount of tension such that the at least one coaxial element does not rotate around the linear axis.

5. The wrapping mechanism of claim 1, wherein the at least one coaxial element is operably connected to the second non-coaxial element, the third non-coaxial elements, and the at least one straight member of the hooked element; and wherein the at least one coaxial element, the second non-coaxial element, the third non-coaxial element, and the at least one straight member are capable of synchronized rotation about the linear axis.

6. The wrapping mechanism of claim 5, wherein the second non-coaxial element, the third non-coaxial element, and the straight member maintain a fixed position in relation to each other around the linear axis.

7. The wrapping mechanism of claim 1, wherein, when the lever is in at least one engaged position, the at least one counterwheel is capable of exacting contact and pressure to a roll of wrapping material positioned proximate to the counterwheel, and the at least one brake pad is capable of exacting contact and pressure to a drum wheel positioned proximate to the brake pad.

8. The wrapping mechanism of claim 1, wherein, when the lever is in at least one engaged position, the at least one counterwheel exacts pressure and tension to a roll of wrapping material positioned proximate to the counterwheel, and the at least one brake pad exacts contact and pressure to a drum wheel positioned proximate to the brake pad.

9. The wrapping mechanism of claim 4, wherein, when the lever is in at least one engaged position and the feed plate is in an active position, the at least one brake pad does not exact contact and pressure to a drum wheel proximate to the brake pad.

10. The wrapping mechanism of claim 1, wherein, when the lever is in at least one or a plurality of disengaged positions, the at least one counterwheel does not exact contact and pressure to a roll of wrapping material positioned proximate to the counterwheel, and the at least one brake pad does not exact contact and pressure to a drum wheel positioned proximate to the brake pad.

11. The wrapping mechanism of claim 1, wherein, when the lever moves from at least one engaged position to one or a plurality of disengaged positions, the at least one counterwheel moves around the linear axis.

12. The wrapping mechanism of claim 4, wherein, when the lever moves from at least one engaged position to one or a plurality of disengaged positions or when the feed plate is in the active position, the at least one brake pad pivots around the linear axis.

13. The wrapping mechanism of claim 1 further comprising a fourth non-coaxial element extending transversely from the linear axis, comprising at least one end that is operably attached to the at least one elongated member; wherein the fourth non-coaxial element is capable of radial movement around the linear axis when the lever is moved from at least one engaged position to one or a plurality of disengaged positions.

14. The wrapping mechanism of claim 4 configured for reducing the speed or stopping movement of a at least one drum wheel positioned proximate to the brake system and oppositely facing at least one support plate between which a material support cylinder is positioned for mounting a roll of wrapping material, wherein the brake system is configured for reducing the speed or stopping movement of the roll of wrapping material in a plurality of engaged and disengaged conditions comprising:
    a first engaged position whereby the lever is in at least one engaged position, the spring is in an active position, the counterwheel is in operable contact with the roll of wrapping material, the feed plate is in the passive position, and the brake pad is in operable contact with the at least one drum wheel;
    a first disengaged position whereby the lever is in at least one engaged position, the spring is in an active position, the counterwheel is in operable contact with the roll of wrapping material, the feed plate is in an active position, and the brake pad is not in operable contact with the at least one drum wheel; and
    a second disengaged position whereby the lever is in at least one disengaged position, the spring is in a at least one passive position, the counterwheel is not in operable contact with the roll of wrapping material, and the brake pad is not in operable contact with the at least one drum wheel.

15. The wrapping mechanism of claim 14, wherein the roll of wrapping material exacts contact and pressure to the counterwheel when the lever is in the at least one engaged position, such that, as the roll of wrapping material is being dispensed, an amount of pressure being exerted to the counterwheel is decreased, causing the brake pad to exert less pressure on the drum wheel of the material support cylinder, and allowing faster rotation of the roll of wrapping material and a steady amount of dispensing of the wrapping material.

16. The wrapping mechanism of claim 15 further comprising a lever plate system comprising:
    at least one lever plate operably attached to at least one support plate at a first pivot point, wherein the at least one lever plate occludes an opening in at least one notch in the at least one support plate in a closed position and exposes the opening in at least one notch in the at least one support plate in an open position;
    at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position;
    at least one spring, operably connected to the at least one lever plate and the at least one lever lock arm; and
    at least one release arm configured for operable contact with the at least one lever lock arm.

17. The wrapping mechanism of claim 15 further comprising a drum lock system comprising:

at least one sidewall;

at least one support plate;

at least one material support cylinder, operably connected to the at least one support plate, comprising a material support arm that defines a linear material axis, and at least one drum plate positioned at or proximate to one end of and operably linked to the material support arm;

at least one locking tab mechanism, operably connected to the at least one support plate, comprising a locking tab and a tension tab, configured for operable contact with the at least one drum plate; and at least one cam tab, operably connected to the at least one sidewall, and configured for operable contact with the at least one locking tab mechanism.

18. The wrapping mechanism of claim 15 further comprising:

a lever plate system comprising:
  at least one lever plate operably attached to at least one support plate at a first pivot point, wherein the at least one lever plate occludes an opening in at least one notch in the at least one support plate in a closed position and exposes the opening in at least one notch in the at least one support plate in an open position;
  at least one lever lock arm, operably attached to the at least one support plate at a second pivot point, that is in operable contact with the at least one lever plate such that the at least one lever lock arm prevents the at least one lever plate from moving from its closed position to its open position in a locked position, and allows the at least one lever plate to move from its closed position to its open position in a unlocked position;
  at least one spring, operably connected to the at least one lever plate and the at least one lever lock arm; and
  at least one release arm configured for operable contact with the at least one lever lock arm; and a drum lock system comprising:
  at least one sidewall;
  at least one support plate;
  at least one material support cylinder, operably connected to the at least one support plate, comprising a material support arm that defines a linear material axis, and at least one drum plate positioned at or proximate to one end of and operably linked to the material support arm;
  at least one locking tab mechanism, operably connected to the at least one support plate, comprising a locking tab and a tension tab, configured for operable contact with the at least one drum plate; and
  at least one cam tab, operably connected to the at least one sidewall, and configured for operable contact with the at least one locking tab mechanism.

19. A wrapping mechanism comprising:

at least two material support cylinders, extending between a first and a second support plate and in operable contact with at least one of the first and second support plates, the at least two material support cylinders rotatably mounted around a support axis;

a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis;

a pair of oppositely facing frame plates; a lock mechanism; at least one feed roller; and a feed plate; wherein the at least two material support cylinders are operably attached to at least the first support plate;

wherein the at least two material support cylinders are configured for supporting rolls of wrapping material, and loading or unloading a roll of wrapping material at the first radial position around the support axis; and wherein at least one radial position of at least one material support cylinder is configured for dispensing wrapping material; and a brake system comprising:

at least one elongated member comprising a longitudinal axis, that defines a linear axis around which at least a first, a second, a third and a fourth non-coaxial elements are capable of movement;

at least one coaxial element that is capable of rotation around the linear axis;

a lever comprising at least a first and a second end, said first end proximate to and in operable contact with the elongated member, configured for rotational movement of the elongated member;

the first non-coaxial element extending transversely from the linear axis and attached to a least one counterwheel configured for exacting contact and pressure to a roll of wrapping material;

the second non-coaxial element extending transversely from the linear axis comprising at least one end operably linked to the at least one coaxial element;

the third non-coaxial element extending transversely from the linear axis positioned at or proximate to one end of and operably linked to the at least one coaxial element and operably connected to at least one brake pad;

a fourth non-coaxial element extending transversely from the linear axis, comprising at least one end that is operably attached to the at least one elongated member, wherein the fourth non-coaxial element is capable of radial movement around the linear axis;

a spring, positioned between the first and second non-coaxial elements, operably linking at least one end of the first and second non-coaxial elements; and a hooked element comprising at least one curved member and at least one straight member, operably linked to and positioned at or proximate to one end of the at least one coaxial element.

20. A wrapping mechanism comprising:

at least two material support cylinders, extending between a first and a second support plate and in operable contact with at least one of the first and second support plates, the at least two material support cylinders rotatably mounted around a support axis;

a mechanism support cylinder operably connected to the first and second support plates and positioned on the support axis between the first and the second support plates around which the at least two material support cylinders revolve in a plurality of radial positions; and at least one drive mechanism operably connected to at least the first support plate such that the drive mechanism facilitates the revolution of the at least two material support cylinders from a first radial position to one of the plurality of radial positions around the support axis;

a pair of oppositely facing frame plates; a lock mechanism; at least one feed roller; and a feed plate; wherein the at least two material support cylinders are operably attached to at least the first support plate;

wherein the at least two material support cylinders are configured for supporting rolls of wrapping material, and loading or unloading a roll of wrapping material at the first radial position around the support axis; and wherein at least one radial position of at least one material support cylinder is configured for dispensing wrapping material; and a brake system comprising:

at least one elongated member comprising a longitudinal axis, that defines a linear axis around which at least a first, a second and a third non-coaxial elements are capable of movement;

at least one coaxial element that is capable of rotation around the linear axis;

a lever comprising at least a first and a second end, said first end proximate to and in operable contact with the elongated member, configured for rotational movement of the elongated member;

the first non-coaxial element extending transversely from the linear axis and attached to a least one counterwheel configured for exacting contact and pressure to a roll of wrapping material;

the second non-coaxial element extending transversely from the linear axis comprising at least one end operably linked to the at least one coaxial element;

the third non-coaxial element extending transversely from the linear axis positioned at or proximate to one end of and operably linked to the at least one coaxial element and operably connected to at least one brake pad;

a spring, positioned between the first and second non-coaxial elements, operably linking at least one end of the first and second non-coaxial elements; and a hooked element comprising at least one curved member and at least one straight member, operably linked to and positioned at or proximate to one end of the at least one coaxial element;

wherein the roll of wrapping material exacts contact and pressure to the counterwheel when the lever is in at least one engaged position, such that, as the roll of wrapping material is being dispensed, an amount of pressure being exerted to the counterwheel is decreased, causing the brake pad to exert less pressure on a drum wheel of the material support cylinder, and allowing faster rotation of the roll of wrapping material and a steady amount of dispensing of the wrapping material.

* * * * *